US012681715B2

(12) United States Patent
Komiyama et al.

(10) Patent No.: US 12,681,715 B2
(45) Date of Patent: Jul. 14, 2026

(54) SYSTEM, CENTER, PROCESSING METHOD, AND STORAGE MEDIUM

(71) Applicant: DENSO CORPORATION, Kariya-city (JP)

(72) Inventors: Masatoshi Komiyama, Kariya-city (JP); Kensho Taki, Kariya-city (JP); Lingfei Xie, Kariya-city (JP); Shigeru Kajioka, Kariya-city (JP); Makiko Tauchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 226 days.

(21) Appl. No.: 18/398,874

(22) Filed: Dec. 28, 2023

(65) Prior Publication Data

US 2024/0126532 A1     Apr. 18, 2024

Related U.S. Application Data

(63) Continuation of application No. PCT/JP2022/025590, filed on Jun. 27, 2022.

(30) Foreign Application Priority Data

Jul. 2, 2021     (JP) ................................. 2021-110902

(51) Int. Cl.
*G06F 8/65*          (2018.01)
*G07C 5/00*          (2006.01)

(52) U.S. Cl.
CPC ............... *G06F 8/65* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 11,727,168 B2 * | 8/2023 | Masuda | G06Q 50/40 701/31.9 |
| 2019/0266295 A1 * | 8/2019 | Masuda | G06Q 50/40 |

(Continued)

FOREIGN PATENT DOCUMENTS

| | | | | |
|---|---|---|---|---|
| CN | 108961462 A | * | 12/2018 | G07C 5/085 |
| CN | 111721542 A | * | 9/2020 | G06F 17/18 |

(Continued)

OTHER PUBLICATIONS

U.S. Appl. No. 18/398,490, filed Dec. 29, 2023, Komiyama et al.
U.S. Appl. No. 18/398,348, filed Dec. 29, 2023, Komiyama et al.

*Primary Examiner* — Philip Wang
(74) *Attorney, Agent, or Firm* — Harness, Dickey & Pierce, PLC

(57)          ABSTRACT

A system includes multiple in-vehicle devices individually mounted on multiple vehicles and a center capable of performing data communication with the multiple in-vehicle devices. Each in-vehicle device transmits vehicle data related to another vehicle device to the center in a first cycle. The center is configured to: store, in a second storage unit, the vehicle data sequentially transmitted from each in-vehicle device; store, in a third storage unit, an index that includes information associated with the vehicle data stored in the second storage unit; perform a first update by adding the received vehicle data to the vehicle data stored in the second storage unit; and perform a second update by adding the index stored in the third storage unit in association with latest one of the vehicle data stored in the second storage unit in a second cycle.

20 Claims, 28 Drawing Sheets

(56) References Cited

U.S. PATENT DOCUMENTS

2019/0384870 A1 * 12/2019 Shiraishi ................ G06Q 40/08
2020/0167326 A1    5/2020 Christensen
2023/0211780 A1 *  7/2023 Tanaka .............. B60W 50/0097
                                                    340/576

FOREIGN PATENT DOCUMENTS

JP          2019153291 A      9/2019
WO     WO-2021016250 A1 *   1/2021    ............ B60W 10/10

* cited by examiner

FIG. 5

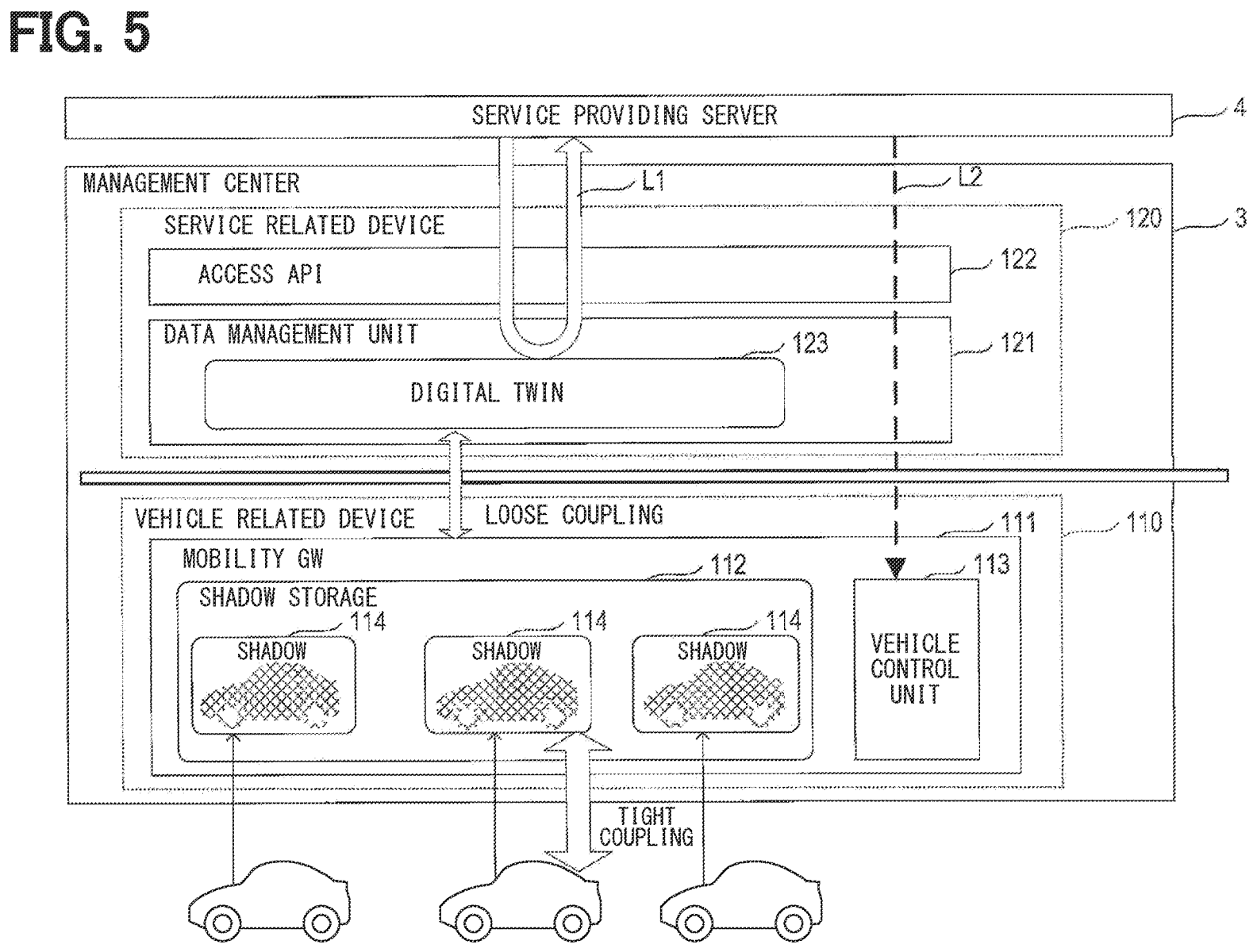

SERVICE PROVIDING SERVER

MANAGEMENT CENTER

SERVICE RELATED DEVICE

ACCESS API

DATA MANAGEMENT UNIT

DIGITAL TWIN

VEHICLE RELATED DEVICE

MOBILITY GW

SHADOW STORAGE

SHADOW

SHADOW

SHADOW

VEHICLE CONTROL UNIT

LOOSE COUPLING

TIGHT COUPLING

| CANID | ECU | POSITION | DLC | UNIQUE LABEL | RESOLUTION | OFFSET | UNIT |
|-------|-----|----------|-----|--------------|------------|--------|------|
| 0x123 | ENG | 2.0 | 8 | ETHA | 1 | 0 | °C |
| 0x123 | ENG | 3.0 | 16 | NE1 | 0.78 | 0 | rpm |

STEERING ANGLE = SSA (STEERING MOVEMENT ANGLE) − SSAZ (STEERING ZERO POINT)

FIG. 9

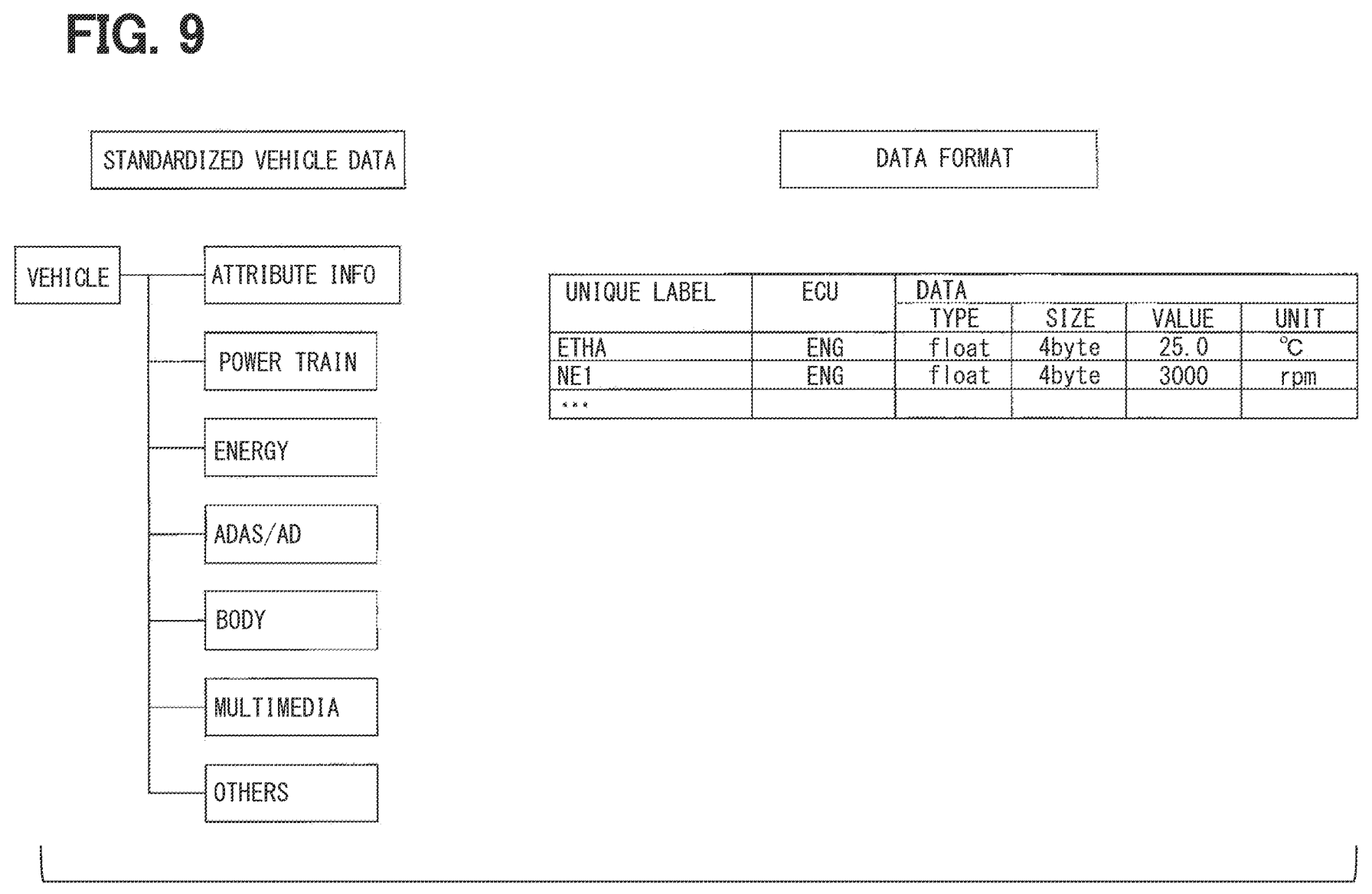

DATA FORMAT

| UNIQUE LABEL | ECU | DATA TYPE | SIZE | VALUE | UNIT |
|---|---|---|---|---|---|
| ETHA | ENG | float | 4byte | 25.0 | °C |
| NE1 | ENG | float | 4byte | 3000 | rpm |
| ... | | | | | |

STANDARDIZED VEHICLE DATA

VEHICLE

ATTRIBUTE INFO

POWER TRAIN

ENERGY

ADAS/AD

BODY

MULTIMEDIA

OTHERS

FIG. 13

| | | UPDATE TIMING |
|---|---|---|
| VEHICLE IDENTIFICATION INFO | VEHICLE IDENTIFICATION NUMBER | NO CHANGE |
| | ... | ... |
| VEHICLE ATTRIBUTE | BRAND NAME | NO CHANGE |
| | ... | ... |
| ... | ... | ... |
| ENGINE | ENGINE SPEED | HIGH FREQUENCY |
| ENGINE OIL | ENGINE OIL TEMPERATURE | LOW FREQUENCY |
| | ... | ... |
| DRIVE MODE | ECO MODE OPERATION STATE | EVENT |
| | ... | ... |
| ... | ... | ... |

FIG. 14

| | MESSAGE TYPE | TRANSMISSION INTERVAL | $\alpha$ | $\beta$ |
|---|---|---|---|---|
| HIGH FREQUENCY DATA — 1ST HIGH FREQUENCY DATA | 1 SECOND (1) (DIVIDED IN HALVES AND TRANSMITTED IN CYCLE OF 500 ms) | mod(tx/(T * 2)) | 2 | 0 |
| 2ND HIGH FREQUENCY DATA | 1 SECOND (2) (DIVIDED IN HALVES AND TRANSMITTED IN CYCLE OF 500 ms) | mod((tx+T)/(T * 2)) | 2 | T |
| 3RD HIGH FREQUENCY DATA | 4 SECONDS (1) (DIVIDED IN HALVES AND TRANSMITTED IN CYCLE OF 2 s) | mod(tx/(T * 8)) | 8 | 0 |
| 4TH HIGH FREQUENCY DATA | 4 SECONDS (2) (DIVIDED IN HALVES AND TRANSMITTED IN CYCLE OF 2 s) | mod((tx+T)/(T * 8)) | 8 | T |
| 5TH HIGH FREQUENCY DATA | 8 SECONDS (1) (DIVIDED IN HALVES AND TRANSMITTED IN CYCLE OF 4 s) | mod(tx/(T * 16)) | 16 | 0 |
| 6TH HIGH FREQUENCY DATA | 8 SECONDS (2) (DIVIDED IN HALVES AND TRANSMITTED IN CYCLE OF 4 s) | mod((tx+T)/(T * 16)) | 16 | T |
| LOW FREQUENCY DATA — 1ST LOW FREQUENCY DATA | 1 MINUTE (1) (DIVIDED IN HALVES AND TRANSMITTED IN CYCLE OF 30 s) | mod(tx/(T * 120)) | 120 | 0 |
| 2ND LOW FREQUENCY DATA | 1 MINUTE (2) (DIVIDED IN HALVES AND TRANSMITTED IN CYCLE OF 30 s) | mod((tx+T)/(T * 120)) | 120 | T |
| 3RD LOW FREQUENCY DATA | 10 MINUTES (1) (DIVIDED IN HALVES AND TRANSMITTED IN CYCLE OF 300 s) | mod(tx/(T * 1200)) | 1200 | 0 |
| 4TH LOW FREQUENCY DATA | 10 MINUTES (2) (DIVIDED IN HALVES AND TRANSMITTED IN CYCLE OF 300 s) | mod((tx+T)/(T * 1200)) | 1200 | T |
| EVENT | | mod(tx/(T * 172800)) | 172800 | 0 |
| INVARIANT DATA | FIRST TIME ONLY | | - | - |

FIG. 19

```
attributes":{
        "firmware-version":
                {"vehicle-firmware-version":"1.00"},
        "mobility-id-information":
                {"vehicle-makers-serial-number":"ND5RC-10010",
                "vehicle-registration-no":"46-49",
                "vin":"0000000000000000"}
},
```

FIG. 21

SHADOW

114

VEHICLE DATA (STORAGE)  114a

DEVICE DATA (STORAGE)  114b

HW VERSION
SW VERSION
...

| PHYSICAL NAME | ITEM NAME | DATA TYPE |
|---|---|---|
| object-id | SERIAL NUMBER ID OF SHADOW | CHARACTER STRING |
| Shadow_version | SHADOW VERSION | NUMERICAL VALUE |
| mobility-data | DATA DEFINITION | CHARACTER STRING |

| PHYSICAL NAME | ITEM NAME | DATA TYPE |
|---|---|---|
| object-id | OBJECT ID | CHARACTER STRING |
| update_time | UPDATE TIME | NUMERICAL VALUE |
| version | VERSION | CHARACTER STRING |
| power_status | SYSTEM STATUS | CHARACTER STRING |
| power_status_timestamp | SYSTEM STATUS NOTIFICATION TIMESTAMP | NUMERICAL VALUE |
| notify_reason | REASON FOR RESULT | CHARACTER STRING |

| ITEM NAME | DATA OVERVIEW |
|---|---|
| gateway-id | GATEWAY ID |
| object-id | OBJECT ID |
| shadow-version | SHADOW VERSION |
| vin | VEHICLE ID |
| location-lon | LONGITUDE OF VEHICLE |
| location-lat | LATITUDE OF VEHICLE |
| location-alt | ALTITUDE OF VEHICLE |

| No. | FIELD NAME | ITEM NAME | FORMAT |
|---|---|---|---|
| 1 | timestamp | TIME | long |
| 2 | schedule-type | SCHEDULE TYPE | keyword |
| 3 | gateway-id | GATEWAY ID | keyword |
| 4 | object-id | OBJECT ID | keyword |
| 5 | shadow-version | TIME (GW) | long |
| 6 | vin | VEHICLE ID | keyword |
| 7 | location | LOCATION | geo_point |
| 8 | alt | ALTITUDE | float |

```
{
    "object-id" : ["dt-000002", "dt-000008"]
    "timestamp-from" : "2019/08/27 5:17:10.500",
    "timestamp-range" : 10,
    "item-names": ["latitude "]
}
```

RQ2

```
{
    "rectangle": [
        "top-left": [
            "lon": 135.8974670767784,
            "lat": 36.16643474082275
        ],
        " bottom-right": [
            "lon": 139.7863560656673,
            "lat": 35.05532363071164
        ]
    ],
    "timestamp-from" : "2019/8/27 5:17:10.500",
    "timestamp-range" : 10,
    "item-names": ["latitude"]
}
```

RQ3

```
{
    "object-id" : ["dt-000002", "dt-000008"]
    "timestamp-from" : "2019/08/27 5:17:10.500",
    "category-names": ["adas-ad "]
}
```

| FIELD NAME | OVERVIEW |
|---|---|
| object-id | UNIQUE ID PER VEHICLE, vin = object-id |
| location | VEHICLE POSITION (LATITUDE, LONGITUDE) |
| alt | VEHICLE POSITION (ALTITUDE) |
| timestamp | TIME IN UNITS OF MILLISECONDS |
| event | RECTANGULAR RANGE OF EVENT (EXAMPLES: RAIN AREA, TRAFFIC JAM AREA) |

LOCATION RANGE

RAIN

RAIN

EVENT AREA

SYSTEM, CENTER, PROCESSING METHOD, AND STORAGE MEDIUM

CROSS REFERENCE TO RELATED APPLICATIONS

The present application is a continuation application of International Patent Application No. PCT/JP2022/025590 filed on Jun. 27, 2022, which designated the U.S. and claims the benefit of priority from Japanese Patent Application No. 2021-110902 filed on Jul. 2, 2021. The entire disclosures of all of the above applications are incorporated herein by reference.

TECHNICAL FIELD

The present disclosure relates to a system that transmits vehicle data from an in-vehicle device to a center and processes the vehicle data, a center that processes vehicle data transmitted from the in-vehicle device, and processing methods and storage medium related to the data processing.

BACKGROUND

There has been known a digital twin simulation that reproduces, in a virtual space, a state of a real-world vehicle by collecting data from the vehicle.

SUMMARY

A system includes multiple in-vehicle devices individually mounted on multiple vehicles and a center capable of performing data communication with the multiple in-vehicle devices. Each in-vehicle device is configured to: store, in a first storage unit, vehicle data transmitted from another device mounted on the corresponding vehicle; and transmit the vehicle data to the center in a first cycle. The center is configured to: store, in a second storage unit, the vehicle data sequentially transmitted from each in-vehicle device; store, in a third storage unit, an index that includes information associated with the vehicle data stored in the second storage unit; perform a first update by adding the received vehicle data to the vehicle data stored in the second storage unit every time the vehicle data is transmitted from each in-vehicle device; and perform a second update by adding the index stored in the third storage unit in association with latest one of the vehicle data stored in the second storage unit in a second cycle, which does not require synchronization with an update timing of the first update.

BRIEF DESCRIPTION OF DRAWINGS

Objects, features and advantages of the present disclosure will become apparent from the following detailed description made with reference to the accompanying drawings.

FIG. 5 is a functional block diagram illustrating a functional configuration of the management center.

FIG. 8 is a diagram illustrating a configuration of a vehicle data conversion table.

FIG. 9 is a diagram illustrating a first layer of standardized vehicle data and a data format thereof.

FIG. 13 is a diagram illustrating an update timing based on the type of vehicle data.

FIG. 14 is a diagram illustrating a transmission cycle based on the type of vehicle data.

FIG. 19 is a diagram illustrating a structure of vehicle data to be transmitted.

FIG. 21 is a diagram illustrating a configuration of a shadow.

FIG. 22 is a diagram illustrating a configuration of a latest index.

FIG. 23 is a diagram illustrating a configuration of an index.

FIG. 25 is a diagram illustrating a specific example of a request.

DETAILED DESCRIPTION

Figure 1:
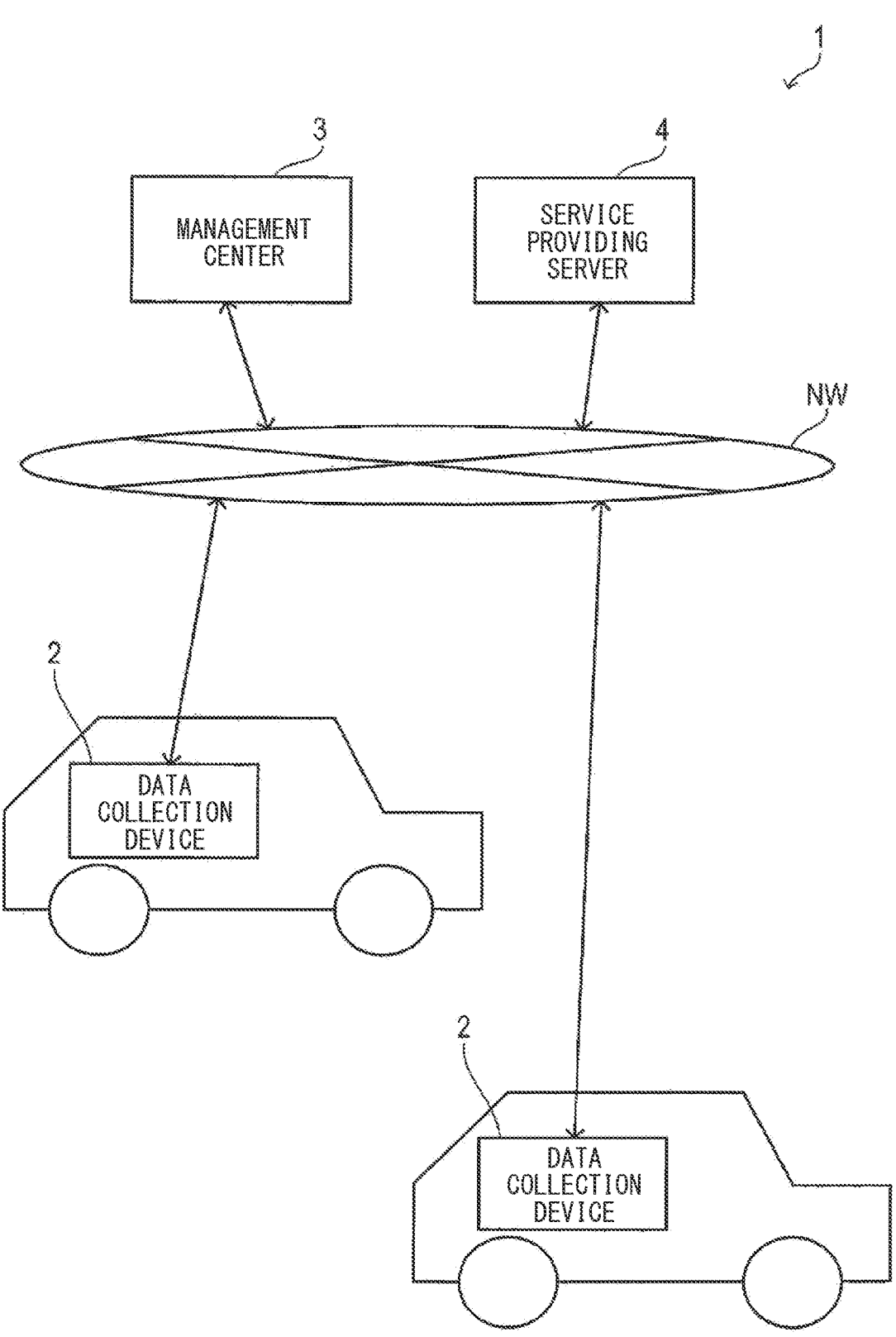
FIG. 1 is a block diagram illustrating a configuration of a mobility IoT system according to a first embodiment.

In recent years, in response to the spread of mobility services, for example, there is provided a fleet service in which a service manager centrally manages vehicles to be managed by periodically collecting vehicle data such as GPS information from the vehicles to be managed and displaying the positions of the vehicles to be managed on a map screen of a browser.

In the system that performs the digital twin simulation and the like described above, vehicle data is transmitted from an in-vehicle device to a center at regular intervals, and the center manages the transmitted vehicle data.

The vehicle data transmitted from the in-vehicle device to the center includes various vehicle data. For example, there are vehicle data that changes largely in a short time and is desirably transmitted with a high frequency (for example, vehicle speed data) and vehicle data that does not change much in a short time and does not need to be transmitted with a high frequency (for example, water temperature data).

In a case where the vehicle data is received on a center side, it is conceivable to perform process of updating the stored vehicle data at every reception timing. Furthermore, on the center side, it is conceivable to perform process such as processing the received vehicle data into data that is easy to use based on mobility services or the like (for example, in consideration of the need or application of services).

However, as a result of detailed studies by the inventors, it has been found that, on the center side, if process such as updating the vehicle data that changes in a short time or the vehicle data that does not change much in a short time at a reception timing or processing the vehicle data into data that can be easily used in mobility services is performed, the calculation load increases.

For example, in a case where the vehicle data is used in mobility services, it is conceivable that it is less necessary to perform data processing described above based on the vehicle data that changes in a short time such as a vehicle speed.

According to an aspect of the present disclosure, a system includes multiple in-vehicle devices individually mounted on multiple vehicles and a center capable of performing data communication with the multiple in-vehicle devices.

Each of the multiple in-vehicle devices includes: a first storage unit that stores vehicle data transmitted from another device mounted on the corresponding vehicle; and a transmission control unit that transmits the vehicle data to the center in a first cycle. The center includes: a second storage unit that stores the vehicle data sequentially transmitted from each of the plurality of in-vehicle device; and a third storage unit that stores an index, the index including information associated with the vehicle data stored in the second storage unit.

The center further includes: a first update unit that updates the vehicle data stored in the second storage unit by adding the received vehicle data to the vehicle data stored in the second storage unit every time the vehicle data is transmitted from each of the plurality of in-vehicle devices; and a second update unit that performs an update by adding the index stored in the third storage unit in association with latest one of the vehicle data stored in the second storage unit in a second cycle, which does not require synchronization with an update timing of the first update unit.

With the above-described system of the present disclosure, the index stored in the third storage unit can be updated in the second cycle different from the first cycle in which the vehicle data is transmitted, so that the calculation load of the center can be reduced. For example, by setting the second cycle to a cycle longer than the first cycle set to transmit the vehicle data with a high frequency, it is possible to reduce the calculation load of the center.

In addition, in a case where vehicle data is used in the mobility service, the index that enables the vehicle data to be extracted can be updated at an appropriate timing (that is, in the second cycle), so that the calculation load of the center can be reduced also in this respect.

According to another aspect of the present disclosure, a center is capable of performing data communication with multiple in-vehicle devices individually mounted on multiple vehicles via communication units of respective vehicles.

The center includes: a communication unit that receives vehicle data transmitted from each of the multiple in-vehicle devices in a first cycle; a second storage unit that stores the received vehicle data; and a third storage unit that stores an index including information associated with the vehicle data stored in the second storage unit.

The center further includes: a first update unit that updates the vehicle data stored in the second storage unit by adding the received vehicle data to the vehicle data stored in the second storage unit every time the vehicle data is transmitted from each of the multiple in-vehicle devices; and a second update unit that performs an update by adding the index stored in the third storage unit in association with latest one of the vehicle data stored in the second storage unit in a second cycle, which does not require synchronization with an update timing of the first update unit.

With the above-described center of the present disclosure, the index stored in the third storage unit can be updated in the second cycle different from the first cycle in which the vehicle data is transmitted, so that the calculation load of the center can be reduced. In addition, in a case where vehicle data is used in the mobility service, the index that enables the vehicle data to be extracted can be updated at an appropriate timing (that is, in the second cycle), so that the calculation load of the center can be reduced also in this respect.

According to another aspect of the present disclosure, a computer-readable non-transitory storage medium storing a control program to be executed by a center is provided. The center is capable of performing data communication with multiple in-vehicle devices individually mounted on multiple vehicles via communication units of respective vehicles. The control program includes instructions to be executed by a computer of the center.

The instructions include: receiving vehicle data transmitted from each of the multiple in-vehicle device in a first cycle; storing the received vehicle data in a second storage unit; and storing, in a third storage unit, an index including information associated with the vehicle data stored in the second storage unit.

The instructions further include: performing a first update by adding the received vehicle data to the vehicle data stored in the second storage unit ever time the vehicle data is received; and performing a second update by adding the index stored in the third storage unit in association with latest one of the vehicle data stored in the second storage unit in a second cycle, which does not require synchronization with an update timing of the first update.

As a result, in the control program of the present disclosure, the index stored in the third storage unit can be updated in the second cycle different from the first cycle in which the vehicle data is transmitted, so that the calculation load of the center can be reduced. In addition, in a case where vehicle data is used in the mobility service, the index that enables the vehicle data to be extracted can be updated at an appropriate timing (that is, in the second cycle), so that the calculation load of the center can be reduced also in this respect.

Hereinafter, embodiments of the present disclosure will be described with reference to the drawings.

1. First Embodiment

1-1. Overall Configuration

A mobility IoT system 1 of the first embodiment of the present disclosure has a function of managing vehicle status on cloud. As illustrated in FIG. 1, the mobility IoT system 1 includes multiple data collection devices 2 (corresponding to edge device), a management center 3, and a service providing server 4. IoT stands for Internet of Things.

The data collection device 2 is mounted on a vehicle and has a function of performing data communication with the management center 3 via a wide area wireless communication network NW.

The management center 3 is a device that manages the mobility IoT system 1. The management center 3 has a function of performing data communication with multiple data collection devices 2 and the service providing server 4 via the wide area wireless communication network NW.

The service providing server 4 is, for example, a server installed to provide a service for managing the operation of the vehicle. Note that the mobility IoT system 1 may include multiple service providing servers with different service contents. The service providing server 4 may be configured as an on-premises server, may be configured as a cloud server, or may be configured as a server physically the same as the management center 3.

Figure 2:
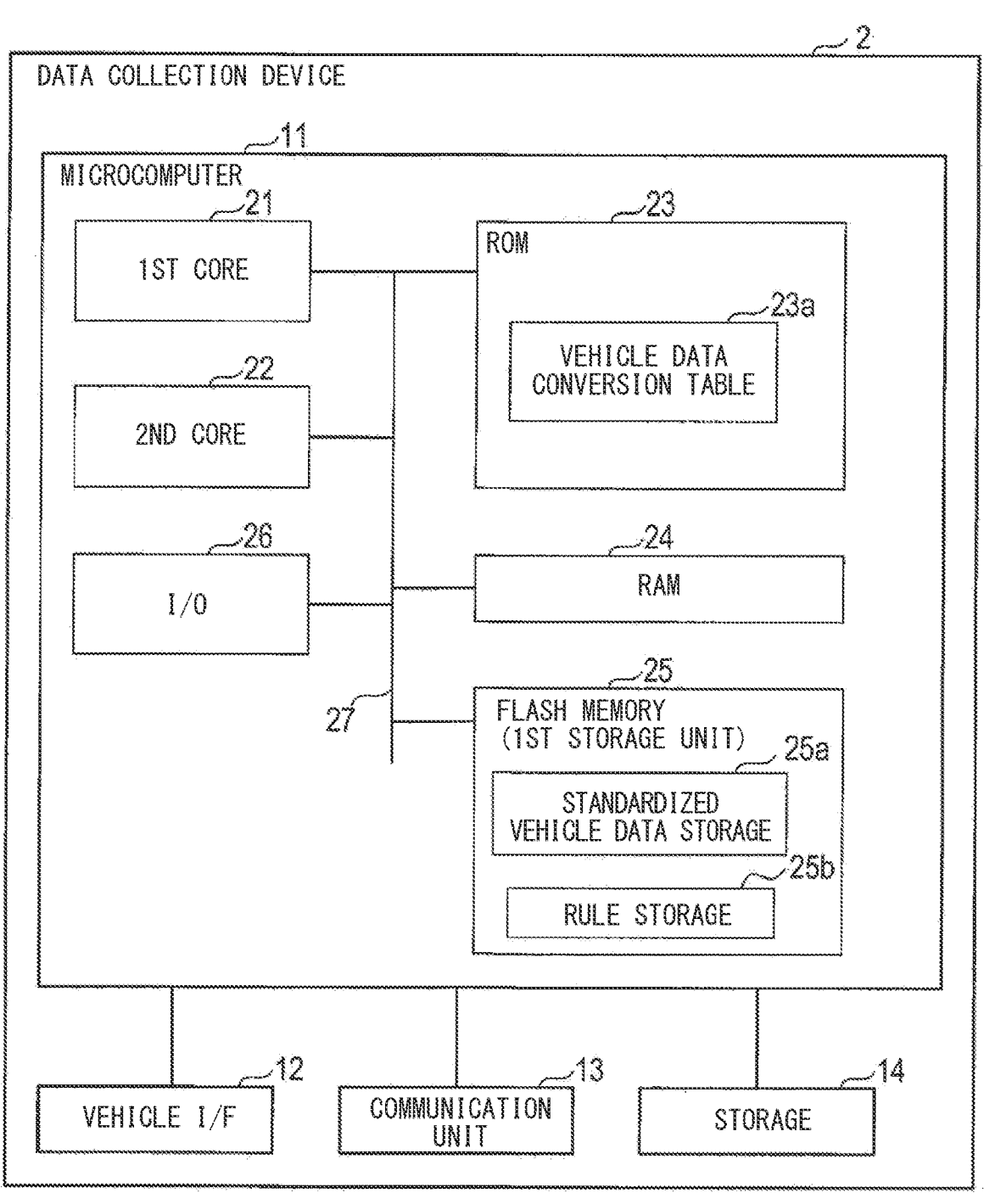
FIG. 2 is a block diagram illustrating a configuration of a data collection device.

As illustrated in FIG. 2, the data collection device 2 includes a microcomputer 11, a vehicle interface (hereinafter, "vehicle I/F") 12, a communication unit 13, and a storage unit 14.

The microcomputer 11 includes a first core 21, a second core 22, a ROM 23, a RAM 24, a flash memory 25, an input and output unit 26, and a bus 27. The flash memory corresponds to a first storage unit.

Various functions of the microcomputer 11 are implemented by the first core 21 and the second core 22 executing programs stored in a non-transitory tangible storage medium. In this example, the ROM 23 corresponds to a non-transitory tangible storage medium storing a program. By executing the program, the method corresponding to the program is performed.

Note that part or all of the functions performed by the first core 21 and the second core 22 may be configured as hardware by one or multiple ICs or the like.

The flash memory 25 is a data-rewritable nonvolatile memory. The flash memory 25 includes a standardized vehicle data storage unit 25a that stores standardized vehicle data to be described later and a rule storage unit 25b.

The input and output unit 26 is a circuit for inputting and outputting data between the outside of the microcomputer 11 and the first core 21 and the second core 22.

The bus 27 connects the first core 21, the second core 22, the ROM 23, the RAM 24, the flash memory 25, and the input and output unit 26 in such a manner that data can be input and output to and from each other.

The vehicle I/F 12 is an input and output circuit for inputting and outputting signals to and from an electronic control device, a sensor, and the like mounted on the vehicle.

The vehicle I/F 12 includes a power supply voltage input port, a general-purpose input and output port, a CAN communication port, an Ethernet communication port, and the like.

The CAN communication port is a port for transmitting and receiving data in accordance with the CAN communication protocol. The Ethernet communication port is a port for transmitting and receiving data on the basis of the Ethernet communication protocol. CAN stands for Controller Area Network. CAN is a registered trademark. Ethernet is a registered trademark.

Another electronic control device mounted on the vehicle is connected to the CAN communication port and the Ethernet communication port. As a result, the data collection device 2 can transmit and receive a communication frame to and from another electronic control device.

The communication unit 13 performs data communication with the management center 3 via the wide area wireless communication network NW.

The storage unit 14 is a storage device for storing various data.

Figure 26:
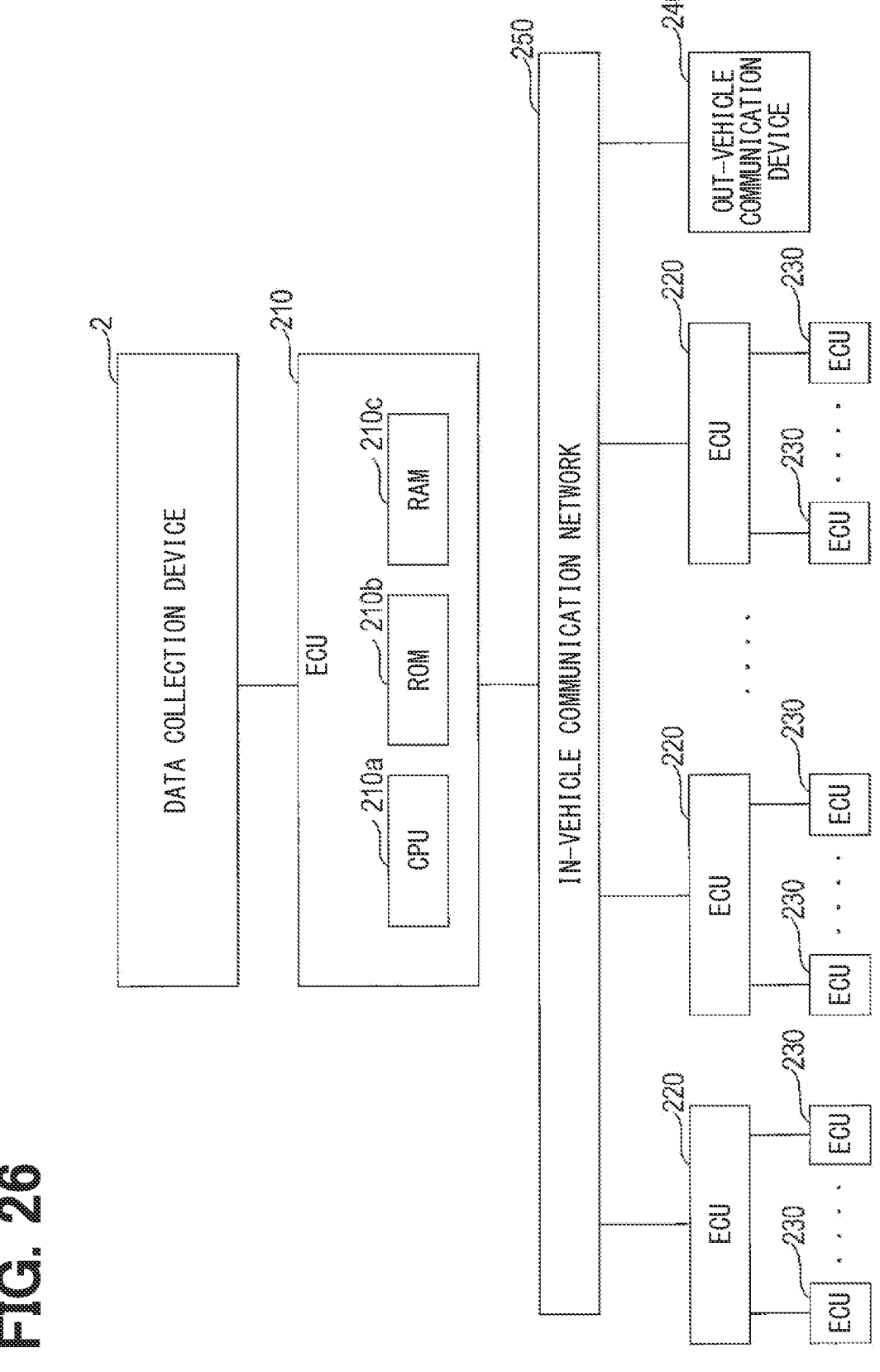
FIG. 26 is a block diagram illustrating a connection state of an ECU mounted on a vehicle.

As illustrated in FIG. 26, one ECU 210, multiple ECUs 220, multiple ECUs 230, an out-vehicle communication device 240, and an in-vehicle communication network 250 are mounted on the vehicle. ECU stands for Electronic Control Unit.

The ECU 210 overall controls multiple ECUs 220 to implement cooperative control of the entire vehicle.

The ECU 220 is provided for each domain divided based on the functions in the vehicle, and mainly executes the control of multiple ECUs 230 present in the domain. Each ECU 220 is connected to a subordinate ECU 230 via a lower layer network (for example, CAN) individually provided. The ECU 220 has a function of centrally managing access authority and the like to the subordinate ECUs 230 and performing authentication and the like of a user. The domain includes, for example, a powertrain, a body, a chassis, a cockpit, and the like.

The ECU 230 connected to the ECU 220 belonging to the powertrain domain includes, for example, an ECU 230 that controls an engine, an ECU 230 that controls a motor, an ECU 230 that controls a battery, and the like.

The ECU 230 connected to the ECU 220 belonging to the body domain includes, for example, an ECU 230 that controls an air conditioner, an ECU 230 that controls a door, and the like.

The ECU 230 connected to the ECU 220 belonging to the chassis domain includes, for example, an ECU 230 that controls a brake, an ECU 230 that controls a steering, and the like.

The ECU 230 connected to the ECU 220 belonging to the cockpit domain includes, for example, an ECU 230 that controls meter and navigation display, an ECU 230 that controls an input device operated by an occupant of the vehicle, and the like.

The out-vehicle communication device 240 performs data communication with a communication device outside the vehicle (for example, a cloud server) via the wide area wireless communication network NW.

The in-vehicle communication network 250 includes CAN FD and Ethernet. CAN FD stands for CAN with Flexible Data Rate. The CAN FD connects the ECU 210, each ECU 220, and the out-vehicle communication device 240 via a bus. The Ethernet individually connects the ECU 210, each ECU 220, and the out-vehicle communication device 240.

The ECU 210 is an electronic control device mainly composed of a microcomputer including a CPU 210a, a ROM 210b, a RAM 210c, and the like. Various functions of the microcomputer are implemented by the CPU 210a executing programs stored in a non-transitory tangible storage medium. In this example, the ROM 210b corresponds to a non-transitory tangible storage medium storing a program. By executing the program, the method corresponding to the program is performed. Note that part or all of the functions performed by the CPU 210a may be configured as hardware by one or multiple ICs or the like. In addition, one microcomputer may constitute the ECU 210, or multiple microcomputers may constitute the ECU 210.

Each of the ECU 220, the ECU 230, and the out-vehicle communication device 240 is an electronic control device mainly composed of a microcomputer including a CPU, a ROM, a RAM, and the like, similarly to the ECU 210. In addition, one microcomputer may constitute each of the ECU 220, the ECU 230, and the out-vehicle communication device 240, or multiple microcomputers may constitute each of the ECU 220, the ECU 230, and the out-vehicle communication device 240. The ECU 220 is an ECU that overall controls one or more ECUs 230, and the ECU 210 is an ECU that overall controls one or more ECUs 220 or overall controls the ECUs 220 and 230 of the entire vehicle including the out-vehicle communication device 240.

The data collection device 2 is connected to the ECU 210 so as to enable data communication with the ECU 210. That is, the data collection device 2 receives information of the ECUs 210, 220, and 230 via the ECU 210. In addition, the data collection device 2 transmits a request related to vehicle control to the ECU 210 or to the ECUs 220 and 230 via the ECU 210.

Figure 3:
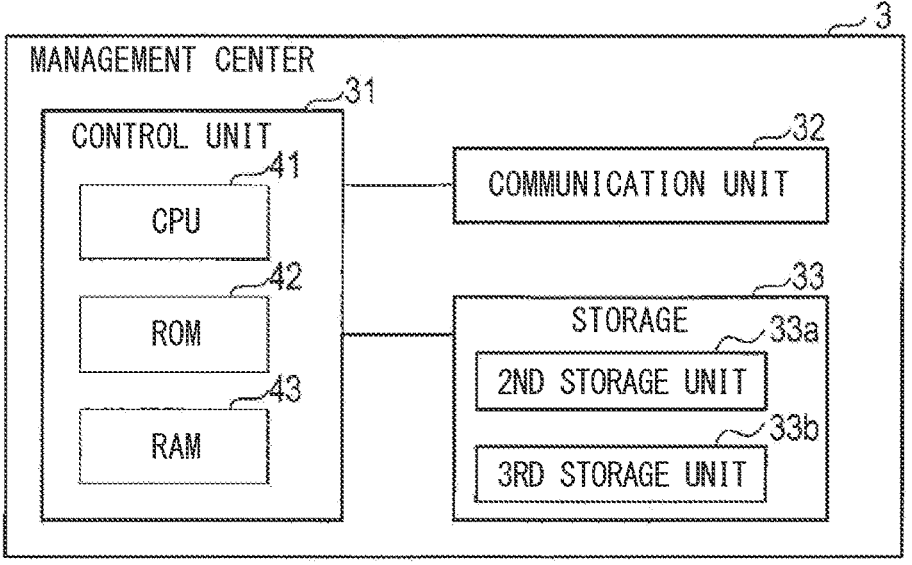
FIG. 3 is a block diagram illustrating a configuration of a management center.

As illustrated in FIG. 3, the management center 3 includes a control unit 31, a communication unit 32, and a storage unit 33. The storage unit 33 includes a second storage unit 33a and a third storage unit 33b, which will be described later.

The control unit 31 is an electronic control device mainly composed of a microcomputer including a CPU 41, a ROM 42, a RAM 43, and the like. Various functions of the microcomputer are implemented by the CPU 41 executing programs stored in a non-transitory tangible storage medium. In this example, the ROM 42 corresponds to a non-transitory tangible storage medium storing a program. By executing the program, the method corresponding to the program is performed. Note that part or all of the functions performed by the CPU 41 may be configured as hardware by one or multiple ICs or the like. In addition, one microcomputer may constitute the control unit 31, or multiple microcomputers may constitute the control unit 31.

The communication unit 32 performs data communication with multiple data collection devices 2 and the service providing server 4 via the wide area wireless communication network NW.

The storage unit 33 is a storage device for storing various data.

1-2. Data Collection Device

The following will describe function of the data collection device 2.

Figure 4:
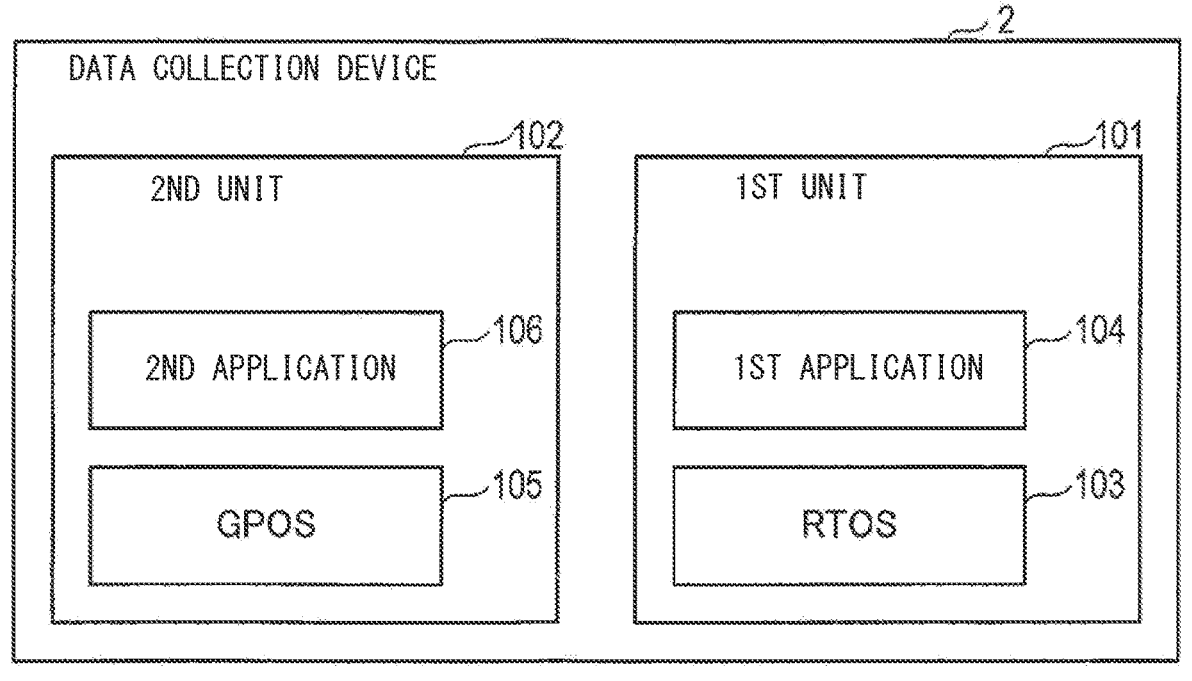
FIG. 4 is a functional block diagram illustrating a functional configuration of the data collection device.

As illustrated in FIG. 4, the data collection device 2 includes a first unit 101 as a functional block implemented by the first core 21 executing a program stored in the ROM 23. The data collection device 2 includes a second unit 102 as a functional block implemented by the second core 22 executing the program stored in the ROM 23.

The first unit 101 includes a real-time operating system (hereinafter, "RTOS") 103 and a first application 104.

The first application 104 performs various process for controlling the vehicle. The first application 104 is configured to be able to access the standardized vehicle data storage unit 25a of the flash memory 25 and refer to standardized vehicle data in order to perform various process for controlling the vehicle.

The RTOS 103 manages the first application 104 in such a manner that the real time property of the process performed by the first application 104 can be ensured.

The second unit 102 includes a general-purpose operating system (hereinafter, "GPOS") 105 and a second application 106.

The second application 106 performs process related to a service provided by the service providing server 4. The second application 106 is configured to be able to access the standardized vehicle data storage unit 25a of the flash memory 25 and refer to standardized vehicle data in order to perform the process related to the service.

The second application 106 performs a scheduling related process in a case of transmitting the vehicle data. The second application 106 is configured to access the rule storage unit 25b of the flash memory 25 and refer to the transmission period of each vehicle data for performing the scheduling related process.

The GPOS 105 is basic software installed in the data collection device 2 in order to operate various applications, and manages the second application 106.

1-3. Management Center

The following will describe functions of the management center 3.

Note that the data collection device 2 may cause a single-core microcomputer to implement the operation in the RTOS 103 and the operation in the GPOS 105 by using a hypervisor.

As illustrated in FIG. 5, the management center 3 includes a vehicle related device 110 and a service related device 120 as functional blocks implemented by the CPU 41 executing a program stored in the ROM 42. The side close to the access to the vehicle is referred to as the vehicle related device 110, the side close to the access from the service providing server 4 is referred to as the service related device 120, the functional block is divided into two, and these two functional blocks are loosely coupled.

The method of implementing these components constituting the management center 3 is not limited to software, and some or all of the components may be implemented by using one or multiple pieces of hardware. For example, in a case where the function is implemented by an electronic circuit which is hardware, the electronic circuit may be implemented by a digital circuit including a large number of logic circuits, an analog circuit, or a combination thereof.

The vehicle related device 110 manages access to the vehicle and data received from the vehicle. The vehicle related device 110 includes a mobility gateway (hereinafter, "mobility GW") 111. The mobility GW 111 has a function of managing data received from the vehicle in addition to a function of relaying an access request to the vehicle to the vehicle.

The mobility GW 111 includes a shadow storage unit 112 and a vehicle control unit 113. The shadow storage unit 112 stores a shadow 114 that accommodates vehicle data for each vehicle on which the data collection device 2 is mounted. The shadow 114 indicates a vehicle data group of a certain vehicle. The vehicle control unit 113 has a function of controlling the vehicle on which the data collection device 2 is mounted on the basis of an instruction from the service providing server 4.

The service related device 120 receives a request from the service providing server 4 and provides vehicle data. The service related device 120 includes a data management unit 121 and an access API 122. API stands for Application Programming Interface.

The data management unit 121 has a function of managing a digital twin 123, which is a virtual space for providing vehicle access independent of a change in the connection state of the vehicle. The data management unit 121 manages data necessary for accessing vehicle data managed by the vehicle related device 110.

The access API 122 is a standard interface for the service providing server 4 to access the mobility GW 111 and the data management unit 121. The access API 122 provides the service providing server 4 with an API for accessing a vehicle and acquiring vehicle data.

1-4. Process Performed by Vehicle I/F

Next, process performed by the vehicle I/F 12 will be described.

When receiving a communication frame, the vehicle I/F 12 determines the communication protocol of the communication frame on the basis of the communication port that has received the communication frame. Specifically, for example, in a case where the communication frame is received at a CAN communication port, the vehicle I/F 12 determines that the communication protocol of the received communication frame is the CAN communication protocol. In addition, for example, in a case where the communication frame is received at an Ethernet communication port, the vehicle I/F 12 determines that the communication protocol of the received communication frame is the Ethernet communication protocol.

The vehicle I/F 12 then determines whether or not the communication frame is necessary on the basis of the identification information of the communication frame, and outputs the received communication frame to the first unit 101 when determining that the communication frame is necessary.

Figure 6:
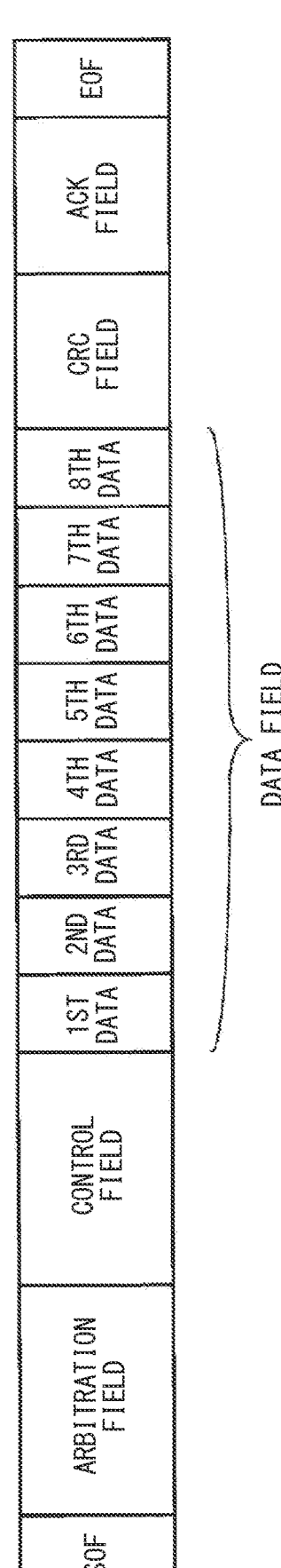
FIG. 6 is a diagram illustrating a configuration of a CAN frame.

As illustrated in FIG. 6, the CAN frame includes a start of frame, an arbitration field, a control field, a data field, a CRC field, an ACK field, and an end of frame. Note that the arbitration field includes a 11 bit or 29 bit identifier (that is, ID) and 1 bit RTR bit.

In addition, the 11 bit identifier used in CAN communication is referred to as CANID. The CANID is preset on the basis of the content of data included in the CAN frame, the transmission source of the CAN frame, the transmission destination of the CAN frame, and the like.

The data field is a payload including first data, second data, third data, fourth data, fifth data, sixth data, seventh data, and eighth data each of which is 8 bits (that is, one byte). Hereinafter, each of the first to eighth data in the data field is also referred to as CAN data.

Therefore, when receiving the CAN frame, the vehicle I/F 12 determines whether or not the received CAN frame is necessary on the basis of the CANID.

1-5. Process Performed by First Unit

Next, process performed by the first unit 101 will be described.

When acquiring the communication frame output from the vehicle I/F 12, the first unit 101 extracts identification information and data from the communication frame, generates standard format data including the identification information and the data, and stores the generated standard format data in the flash memory 25. For example, when acquiring a CAN frame, the first unit 101 generates the standard format data including a CANID and first to eighth data.

Note that, in a case where the standard format data including the same identification information as that in the generated standard format data has already been stored in the flash memory 25, the first unit 101 overwrites and stores the standard format data, thereby updating the standard format data.

1-6. Process Performed by Second Unit

Next, the procedure of data standardization process performed by the second unit 102 will be described. The data standardization process is process repeatedly performed during the operation of the microcomputer 11.

Figure 7:
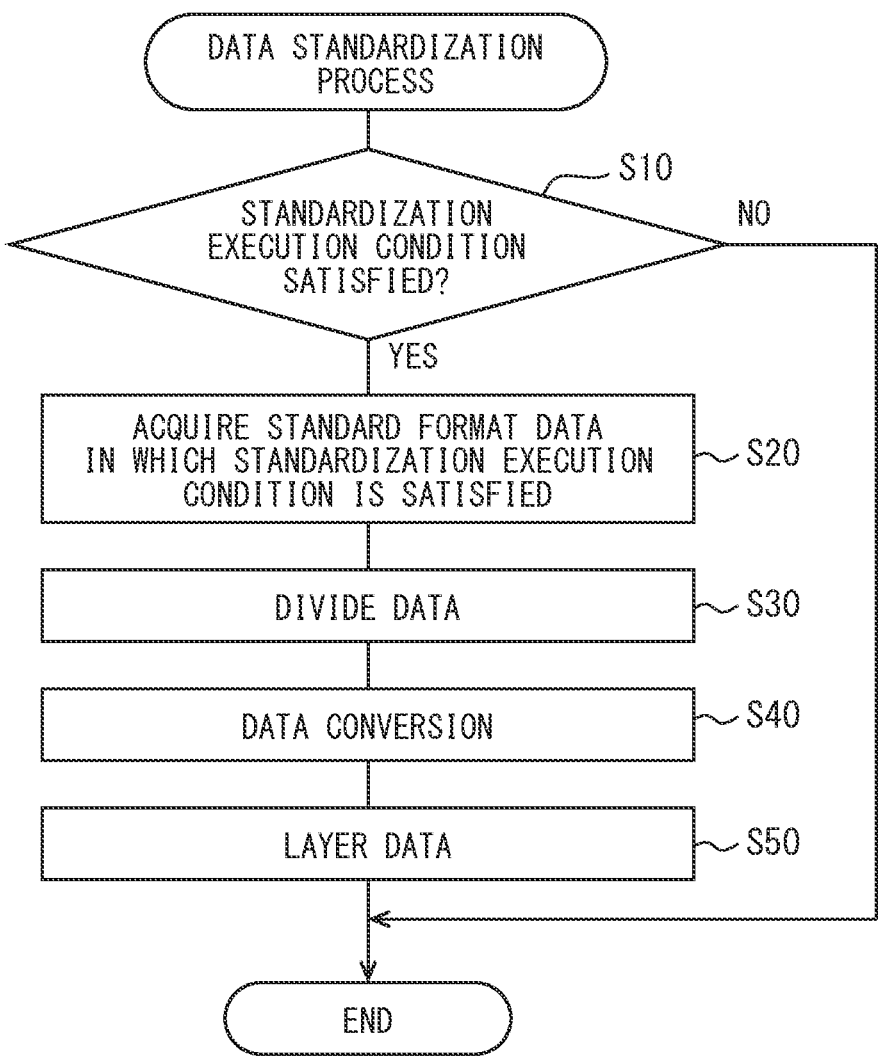
FIG. 7 is a flowchart illustrating data standardization process.

When the data standardization process is performed, as illustrated in FIG. 7, the second core 22 first determines whether or not a preset standardization execution condition is satisfied in S10.

The standardization execution condition is that at least one of a first high frequency standardization condition, a second high frequency standardization condition, a third high frequency standardization condition, a first low frequency standardization condition, a second low frequency standardization condition, an event standardization condition, or an invariant standardization condition to be described later is satisfied.

The first high frequency standardization condition is that a preset first high frequency standardization cycle (for example, 500 ms in the present first embodiment) elapses.

The second high frequency standardization condition is that a preset second high frequency standardization cycle (for example, 2 s in the present first embodiment) elapses.

The third high frequency standardization condition is that a preset third high frequency standardization cycle (for example, 4 s in the present first embodiment) elapses.

The first low frequency standardization condition is that a preset first low frequency standardization cycle (for example, 30 s in the present first embodiment) elapses.

The second low frequency standardization condition is that a preset second low frequency standardization cycle (for example, 300 s in the present first embodiment) elapses.

The event standardization condition is that a preset event standardization cycle (for example, 12 hours in the present first embodiment) elapses. As the event standardization condition, the first to third high frequency standardization condition may be adopted.

The invariant standardization condition is that the current process in S10 is the first process in S10 after the microcomputer 11 is activated.

Here, in a case where the standardization execution condition is not satisfied, the second core 22 ends the data standardization process. On the other hand, in a case where the standardization execution condition is satisfied, in S20, the second core 22 acquires, from the flash memory 25, the standard format data corresponding to the satisfied standardization condition among the seven standardization conditions constituting the standardization execution condition. For example, in a case where the second high frequency standardization condition is satisfied, the second core 22 acquires the standard format data corresponding to the second high frequency standardization condition in S20.

In S30, the second core 22 then divides the data included in the standard format data. For example, since the standard format data generated from the CAN frame includes the CAN ID and the first to eighth data, the second core 22 divides the first to eighth data into one byte each and extracts eight pieces of CAN data.

In addition, in S40, the second core 22 refers to a vehicle data conversion table 23a stored in the ROM 23, and converts each piece of extracted data divided in S30 into a control label and vehicle data.

The vehicle data conversion table 23a includes normalization information and semanticization information.

The normalization information is information for normalizing the extracted data in such a manner that the same physical quantity has the same value regardless of the vehicle type and the vehicle manufacturer.

The semanticization information is information (for example, an arithmetic expression and a conversion table) for conversion the normalized vehicle data into meaningful vehicle data.

As illustrated in FIG. 8, the normalization information in the vehicle data conversion table 23a includes, for example, "CANID", "ECU", "position", "DLC", "unique label", "resolution", "offset", and "unit" as setting items.

"ECU" is information indicating an ECU as the transmission source of the CAN frame. For example, "ENG" indicates an engine ECU.

"Position" is information indicating the position of the CAN data in the data field. "DLC" is information indicating a data length. DLC stands for Data Length Code.

"Unique label" is information indicating a control label. For example, "ETNA" indicates an intake air temperature, and "NE1" indicates an engine speed. "Resolution" is information indicating a numerical value per bit.

Therefore, data corresponding to "unique label" is extracted from the standard format data by "CANID", "ECU", "position", "DLC", and "unique label". In addition, the extracted data is converted into vehicle data with "resolution", "offset", and "unit".

For example, as illustrated in FIG. 8, the semanticization information in the vehicle data conversion table 23a is a conversion formula for performing conversion into "steering angle" by subtracting "steering zero point" with the control label "SSAZ" from "steering movement angle" with the control label "SSA". As a result, the vehicle data representing "steering movement angle" and the vehicle data representing "steering zero point" are converted into the vehicle data representing "steering angle" with the meaning of "steering amount from the reference position".

When the process in S40 ends, the second core 22 layers the converted vehicle data in S50 and stores the layered data in the flash memory 25 as illustrated in FIG. 7. Specifically, the second core 22 stores the converted vehicle data in the corresponding area of the standardized vehicle data storage unit 25a provided in the flash memory 25.

The standardized vehicle data storage unit 25a stores standardized vehicle data configured by layering vehicle data.

The standardized vehicle data is generated for each vehicle (that is, for each data collection device 2) and has a multi-layer structure. In the standardized vehicle data, one or multiple items are set in each of multiple layers. For example, as illustrated in FIG. 9, the standardized vehicle data includes "attribute information", "powertrain", "energy", "ADAS/AD", "body", "multimedia", and "others" as items set in a first layer, which is the highest level. ADAS stands for Advanced Driver Assistance System. AD stands for Autonomous Driving. These "attribute information", "powertrain", "energy", and the like correspond to categories.

In addition, each vehicle data includes, as items, "unique label", "ECU", "data type", "data size", "data value", and "data unit". "Unique label" and "ECU" are as described above. "Data type", "data size", and "data unit" indicate a type, a size, and a unit related to a numerical value indicated by "data value", respectively.

Figure 10:
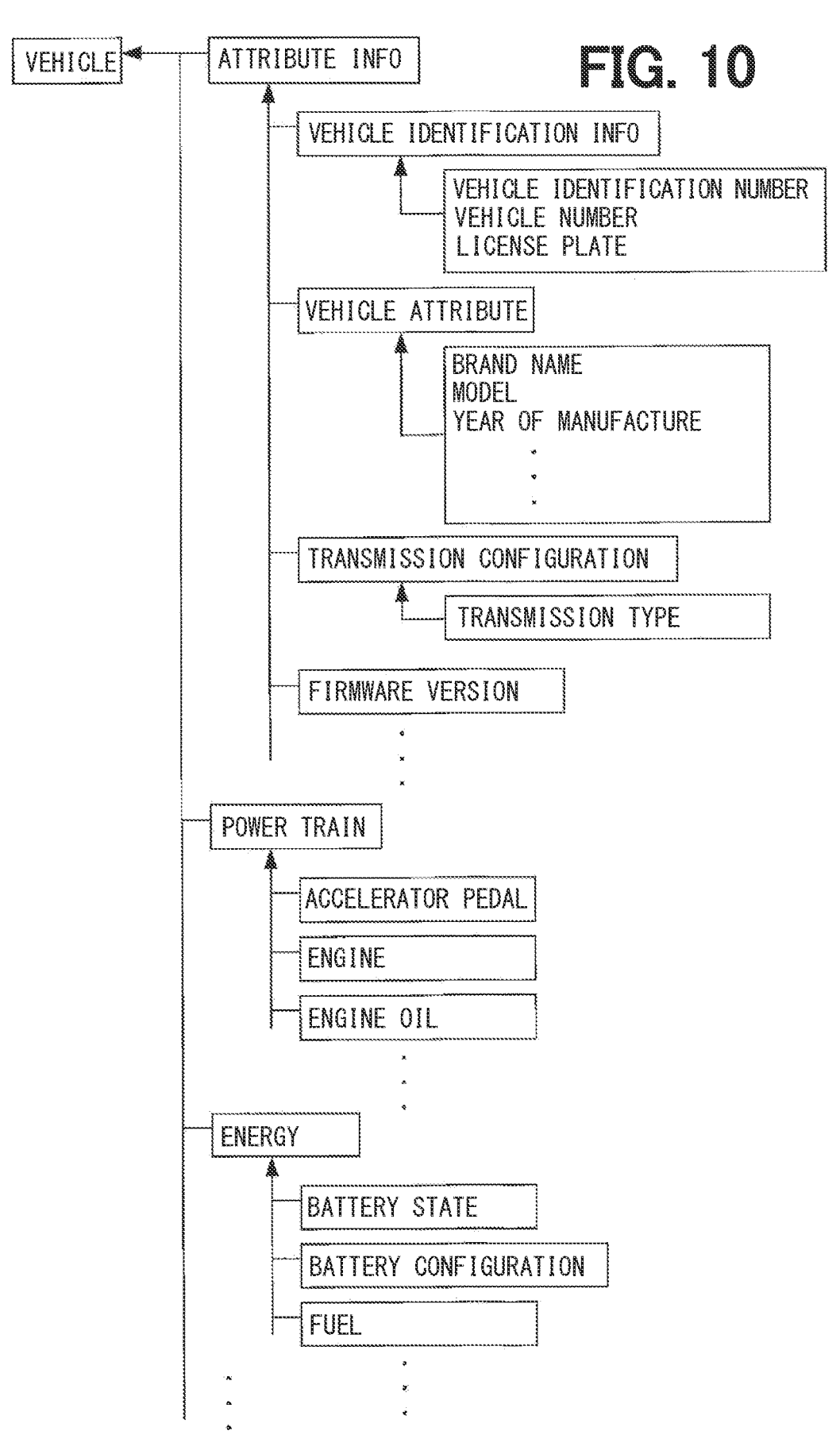
FIG. 10 is a diagram illustrating a configuration of the standardized vehicle data.

As illustrated in FIG. 10, the standardized vehicle data includes at least a second layer and a third layer in addition to the first layer. The second layer is a layer immediately below the first layer, and the third layer is a layer immediately below the second layer. The standardized vehicle data is an item set in the normalization and semanticization process described above. The standardized vehicle data has a data structure, which is a layered structure.

For example, "attribute information", which is an item in the first layer, includes "vehicle identification information", "vehicle attribute", "transmission configuration", "firmware version", and the like as items in the second layer.

"Vehicle identification information" is a category name indicating information that can uniquely identify the vehicle. "Vehicle attribute" is a category name indicating the type of the vehicle. "Transmission information" is a category name indicating information related to a transmission. "Firmware version" is a category name indicating information related to the firmware of the vehicle.

In addition, "powertrain", which is an item in the first layer, is a category name indicating powertrain information, and includes "accelerator pedal", "engine", "engine oil", and the like as items in the second layer.

"Accelerator pedal" includes one or more pieces of vehicle data such as the state and opening of an accelerator pedal. "Engine" includes one or more pieces of individual vehicle data such as an engine state and an engine speed. These second layers also correspond to categories. The same applies to other items in the first layer.

In addition, "energy", which is an item in the first layer, is a category name indicating energy information, and includes "battery state", "battery configuration", "fuel", and the like as items in the second layer.

"Vehicle identification information", which is an item in the second layer, includes "vehicle identification number", "vehicle number", and "license plate" as items in the third layer. The items in the third layer include one or more pieces of individual vehicle data (also referred to as "items").

"Vehicle attribute", which is an item in the second layer, includes "brand name", "model", "year of manufacture", and the like as items in the third layer.

"Transmission configuration", which is an item in the second layer, includes "transmission type" as an item in the third layer.

The items are also referred to as items, and an item having lower layer is also referred to as a category.

For example, in a case where the control label of the converted vehicle data is "vehicle identification information", the second core 22 stores the converted vehicle data in a storage area in which the first layer is "attribute information", the second layer is "vehicle identification information", and the third layer is "vehicle identification number" in the standardized vehicle data storage unit 25a.

1-7. Generation Procedure of Standardized Vehicle Data

Figure 11:
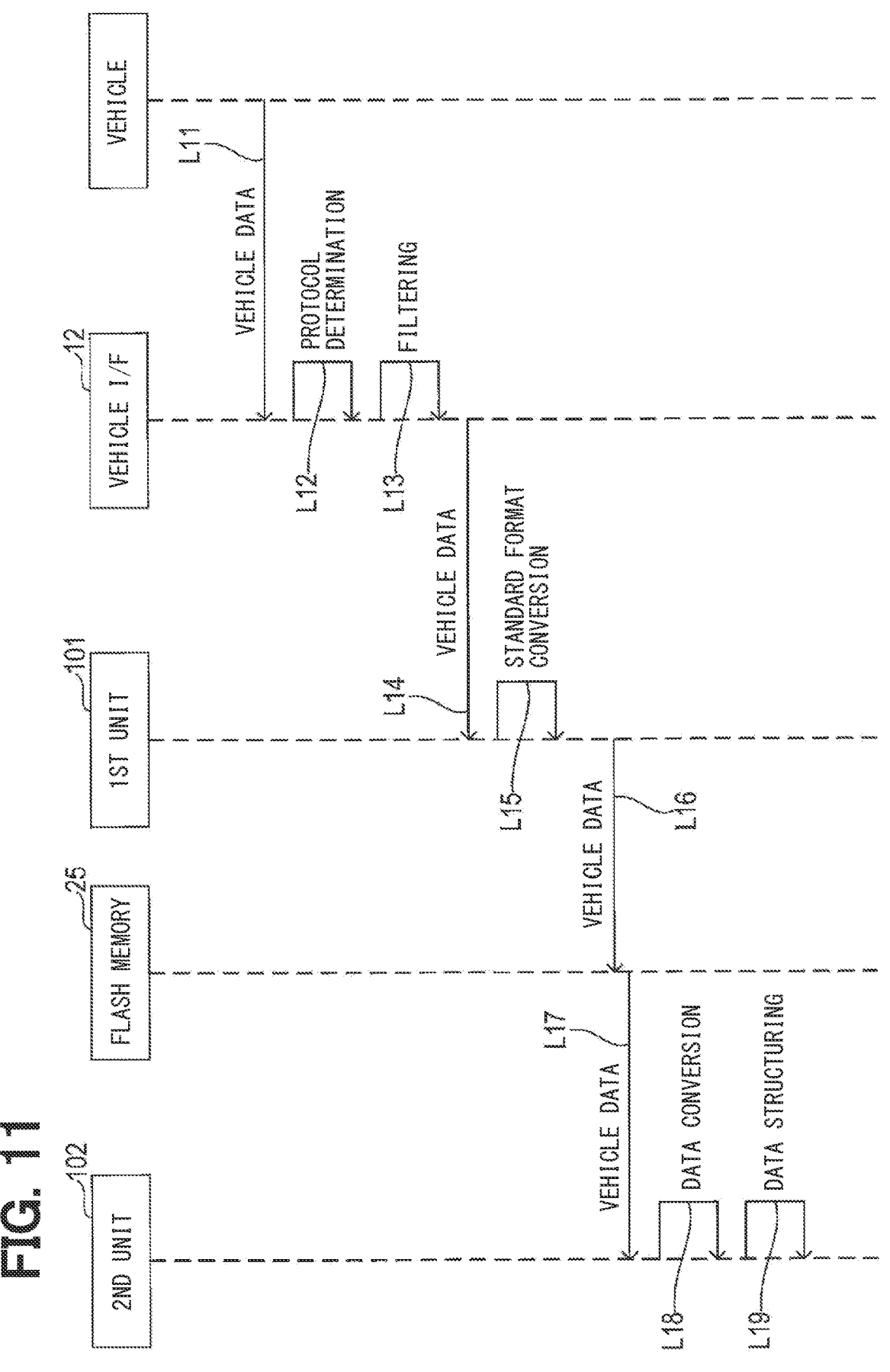
FIG. 11 is a sequence diagram illustrating a procedure of generating the standardized vehicle data.

Next, the procedure in which the data collection device 2 generates the standardized vehicle data will be described using a sequence diagram illustrated in FIG. 11.

As indicated by an arrow L11, when the vehicle I/F 12 acquires vehicle data from the vehicle, the vehicle I/F 12 performs communication protocol determination as indicated by an arrow L12. In addition, the vehicle I/F 12 filters unnecessary vehicle data as indicated by an arrow L13, and outputs necessary vehicle data to the first unit 101 as indicated by an arrow L14.

When acquiring the vehicle data from the vehicle I/F 12, the first unit 101 converts the vehicle data into a standard format as indicated by an arrow L15, and stores the vehicle data converted into the standard format in the flash memory 25 as indicated by an arrow L16.

When acquiring the vehicle data converted into the standard format from the flash memory 25 as indicated by an arrow L17, the second unit 102 converts the acquired vehicle data as indicated by an arrow L18. In addition, as indicated by an arrow L19, the second unit 102 generates standardized vehicle data by structuring the converted data.

1-8. Scheduling of Transmission Data

Next, scheduling of transmission data (that is, vehicle data to be transmitted) performed by the data collection device 2 will be described. That is, the transmission interval control when the data collection device 2 transmits vehicle data to the management center 3 will be described.

Figure 12:
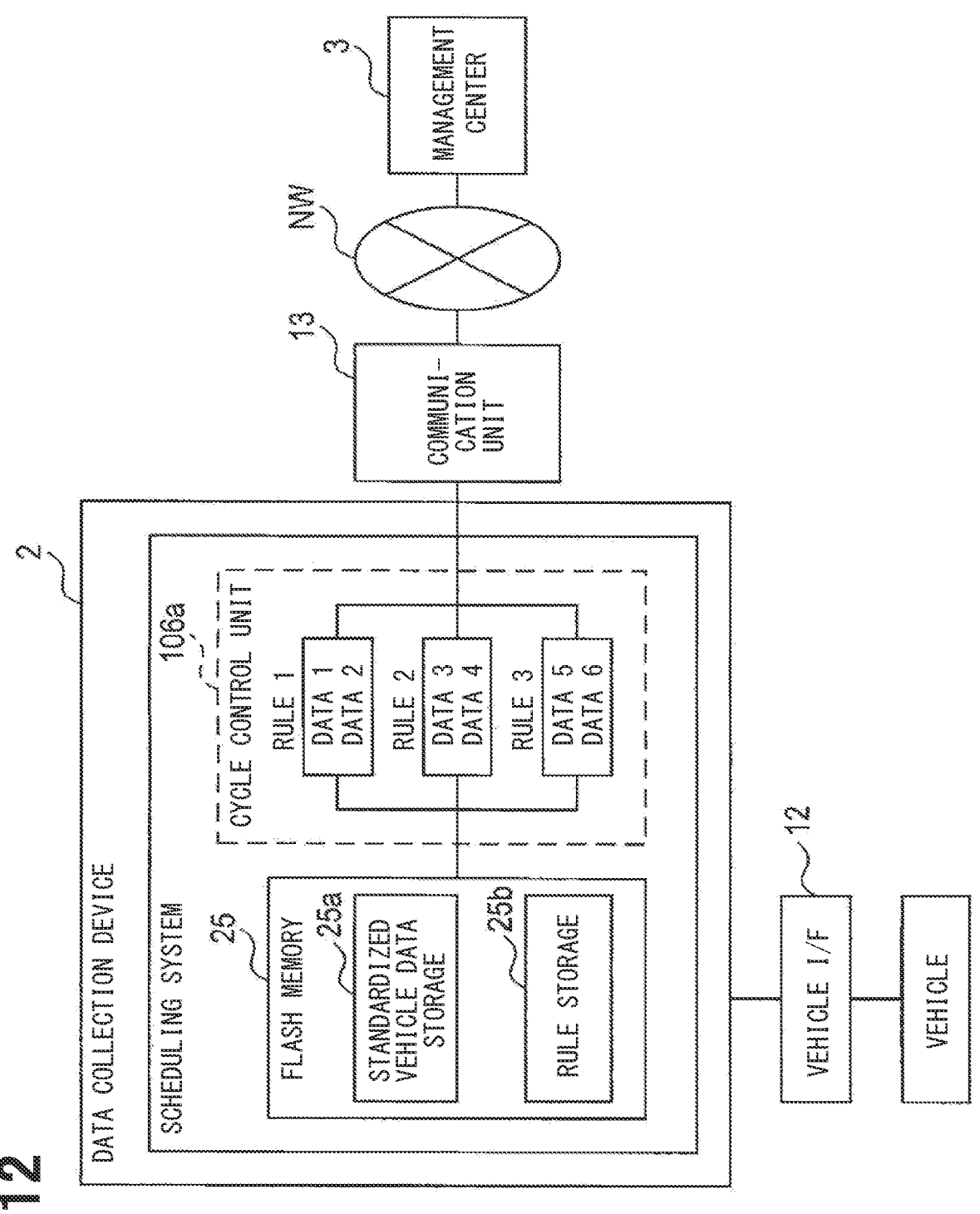
FIG. 12 is a functional block diagram illustrating a functional configuration of a scheduling system of the data collection device.

As illustrated in FIG. 12, the scheduling system of the data collection device 2 can be implemented by a rule stored in the rule storage unit 25b of the flash memory 25 and process executed by a cycle control unit 106a. Note that the cycle control unit 106a can be implemented by process executed by the second application 106.

The rule is a rule for determining a transmission cycle (that is, a first cycle) to the management center 3 based on the type of vehicle data. Note that, in FIG. 12, data 1 and data 2 as the type indicate data in which the transmission cycle is set based on a predetermined rule 1, data 3 and data 4 as the type indicate data in which the transmission cycle is set based on a rule 2 different from the rule 1, and data 5 and data 6 as the type indicate data in which the transmission cycle is set based on a rule 3 different from the rule 1 and the rule 2.

Note that the setting items of the rule in scheduling include "item", "transmission frequency", "initial synchronization timing", "category", and the like. The initial synchronization timing indicates a timing at which vehicle data is transmitted to the management center 3 for the first time after the data collection device 2 is activated. The transmission cycle may be set on a vehicle data item basis (that is, on an item basis), or may be set on a vehicle data category basis.

Hereinafter, a specific description will be given.

As illustrated in FIG. 13, examples of the vehicle data include various vehicle data divided into categories such as vehicle identification information, a vehicle attribute, an engine, engine oil, and a drive mode. Further, the various vehicle data are classified into specific categories or items. For example, the category "vehicle identification information" is divided into items "vehicle identification number", "vehicle number", and "license plate", the category "engine" is divided into "engine on/off state" and "engine speed", and the category "engine oil temperature" is divided into "engine oil" and the like.

For these divided pieces of vehicle data, the transmission frequency (that is, transmission frequency: transmission cycle) is set on the basis of the viewpoint of the cycle of transmission from another electronic control device via the CAN, the degree of change in a vehicle data value, and the like. For example, in a case where the frequency of transmission from another electronic control device is originally low, it is conceivable to lower the transmission frequency (that is, to lengthen the transmission cycle). Even in a case where the frequency of transmission from another electronic control device is high, for example, the value of a cooling water temperature does not change suddenly, and thus it is conceivable to lower the transmission frequency (that is, to lengthen the transmission cycle).

Specifically, for example, since the engine speed changes in a short time, the transmission cycle is set to a short transmission cycle so as to transmit with a high frequency. For example, since the temperature of the engine oil does not change in a short time, the transmission cycle is set to a relatively long transmission cycle in which transmission is performed with a low frequency lower than the high frequency. For example, in the ECO mode operation state for saving fuel, as the event data in the state, the transmission cycle is set to a short transmission cycle corresponding to a high frequency, for example. Note that a longer transmission cycle than that in the case of the high frequency can be adopted in the event data. For example, since the vehicle identification number only needs to be transmitted first from the corresponding vehicle, the vehicle identification number is set to be transmitted as invariant data, for example, only at the time of the first transmission. Specifically, for example, the vehicle identification number can be set to be transmitted at the time of the first transmission from the vehicle after the ignition switch of the vehicle is turned on. Note that, in the table of the rule illustrated in FIG. 13, a specific numerical value may be described as a setting value of the transmission frequency in consideration of the update timing.

Further, as illustrated in FIG. 14, the vehicle data transmitted with a high frequency (that is, high frequency data) and the vehicle data transmitted with a low frequency (that is, low frequency data) may be more finely classified based on the necessity of transmission. FIG. 14 is a table illustrating details of the transmission frequency related to the rule. Note that the table indicating the transmission cycle based on the type of vehicle data, which is illustrated in FIG. 14, is stored in advance in, for example, the rule storage unit 25b of the data collection device 2.

For example, as will be described in detail later, the transmission cycle of the vehicle data is set by a predetermined calculation formula "mod $\{(tx+\beta)/(T\times\alpha)\}$". Note that transmission is performed in a case where the calculation formula is 0.

Specifically, for example, the first and second high frequency data are set as the high frequency data to be transmitted in a cycle of one second. Note that, in a case where the amount of data is large, the high frequency data can be divided into multiple pieces and transmitted. For example, the high frequency data can be divided into halves and continuously transmitted every half of the transmission cycle (for example, every 500 ms). The same applies to other vehicle data to be transmitted.

In addition, for example, the third and fourth high frequency data are set as the high frequency data to be transmitted in a cycle of four seconds. For example, the fifth and sixth high frequency data are set as the high frequency data to be transmitted in a cycle of eight seconds.

For example, the first and second low frequency data are set as the low frequency data to be transmitted in a cycle of one minute. For example, the third and fourth low frequency data are set as the low frequency data to be transmitted in a cycle of ten minutes.

Each vehicle data set as described above is transmitted to the management center 3 by the communication unit 13 with a transmission cycle corresponding to each vehicle data.

Note that the data collection device 2 voluntarily transmits each vehicle data to the management center 3 on the basis of the transmission cycle, but the rule and the transmission cycle may be changed by an instruction from the side of the management center 3.

1-9. Procedure of Data Transmission Process Executed by Data Collection Device Next, the procedure of process of transmitting data to the management center 3 performed by the data collection device 2 will be described. The data transmission process is process repeatedly performed during the operation of the microcomputer 11.

Figure 15:
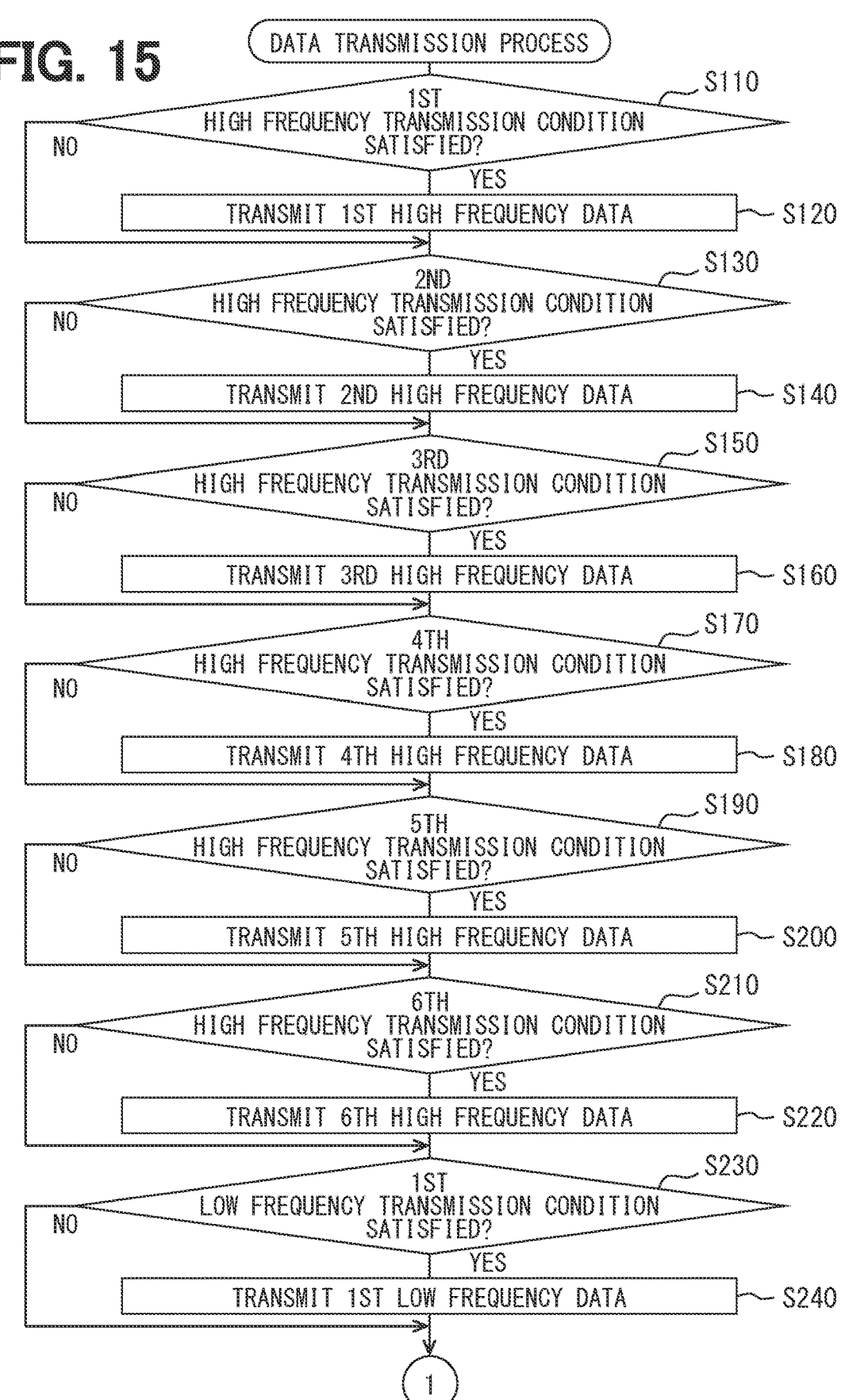
FIG. 15 is a flowchart illustrating a first half of data transmission process.

When the data transmission process is performed, as illustrated in FIG. 15, the second core 22 first determines whether or not a preset first high frequency transmission condition is satisfied in S110. The first high frequency transmission condition is that mod $\{tx/(T\times2)\}$ is 0 where the current time is tx and the transmission interval set value (for example, 500 ms in the first embodiment) is T.

Here, in a case where the first high frequency transmission condition is not satisfied, the second core 22 proceeds to S130. On the other hand, in a case where the first high frequency transmission condition is satisfied, in S120, the second core 22 extracts the vehicle data set as the first high frequency data in the vehicle data constituting the standardized vehicle data from the standardized vehicle data storage unit 25*a*, transmits the vehicle data to the management center 3, and proceeds to S130.

When proceeding to S130, the second core 22 determines whether or not a preset second high frequency transmission condition is satisfied. The second high frequency transmission condition is that mod $\{(tx+T)/(T\times2)\}$ is 0.

Here, in a case where the second high frequency transmission condition is not satisfied, the second core 22 proceeds to S150. On the other hand, in a case where the second high frequency transmission condition is satisfied, in S140, the second core 22 extracts the vehicle data set as the second high frequency data in the vehicle data constituting the standardized vehicle data from the standardized vehicle data storage unit 25*a*, transmits the vehicle data to the management center 3, and proceeds to S150.

When proceeding to S150, the second core 22 determines whether or not a preset third high frequency transmission condition is satisfied. The third high frequency transmission condition is that mod $\{tx/(T\times8)\}$ is 0.

Here, in a case where the third high frequency transmission condition is not satisfied, the second core 22 proceeds to S170. On the other hand, in a case where the third high frequency transmission condition is satisfied, in S160, the second core 22 extracts the vehicle data set as the third high frequency data in the vehicle data constituting the standardized vehicle data from the standardized vehicle data storage unit 25*a*, transmits the vehicle data to the management center 3, and proceeds to S170.

When proceeding to S170, the second core 22 determines whether or not a preset fourth high frequency transmission condition is satisfied. The fourth high frequency transmission condition is that mod $\{(tx+T)/(T\times8)\}$ is 0.

Here, in a case where the fourth high frequency transmission condition is not satisfied, the second core 22 proceeds to S190. On the other hand, in a case where the fourth high frequency transmission condition is satisfied, in S180, the second core 22 extracts the vehicle data set as the fourth high frequency data in the vehicle data constituting the standardized vehicle data from the standardized vehicle data storage unit 25*a*, transmits the vehicle data to the management center 3, and proceeds to S190.

When proceeding to S190, the second core 22 determines whether or not a preset fifth high frequency transmission condition is satisfied. The fifth high frequency transmission condition is that mod $\{tx/(T\times16)\}$ is 0.

Here, in a case where the fifth high frequency transmission condition is not satisfied, the second core 22 proceeds to S210. On the other hand, in a case where the fifth high frequency transmission condition is satisfied, in S200, the second core 22 extracts the vehicle data set as the fifth high frequency data in the vehicle data constituting the standardized vehicle data from the standardized vehicle data storage unit 25*a*, transmits the vehicle data to the management center 3, and proceeds to S210.

When proceeding to S210, the second core 22 determines whether or not a preset sixth high frequency transmission condition is satisfied. The sixth high frequency transmission condition is that mod $\{(tx+T)/(T\times16)\}$ is 0.

Here, in a case where the sixth high frequency transmission condition is not satisfied, the second core 22 proceeds to S230. On the other hand, in a case where the sixth high frequency transmission condition is satisfied, in S220, the second core 22 extracts the vehicle data set as the sixth high frequency data in the vehicle data constituting the standardized vehicle data from the standardized vehicle data storage unit 25*a*, transmits the vehicle data to the management center 3, and proceeds to S230.

When proceeding to S230, the second core 22 determines whether or not a preset first low frequency transmission condition is satisfied. The first low frequency transmission condition is that mod $\{tx/(T\times120)\}$ is 0.

Here, in a case where the first low frequency transmission condition is not satisfied, the second core 22 proceeds to S250. On the other hand, in a case where the first low frequency transmission condition is satisfied, in S240, the second core 22 extracts the vehicle data set as the first low frequency data in the vehicle data constituting the standardized vehicle data from the standardized vehicle data storage unit 25*a*, transmits the vehicle data to the management center 3, and proceeds to S250.

Figure 16:
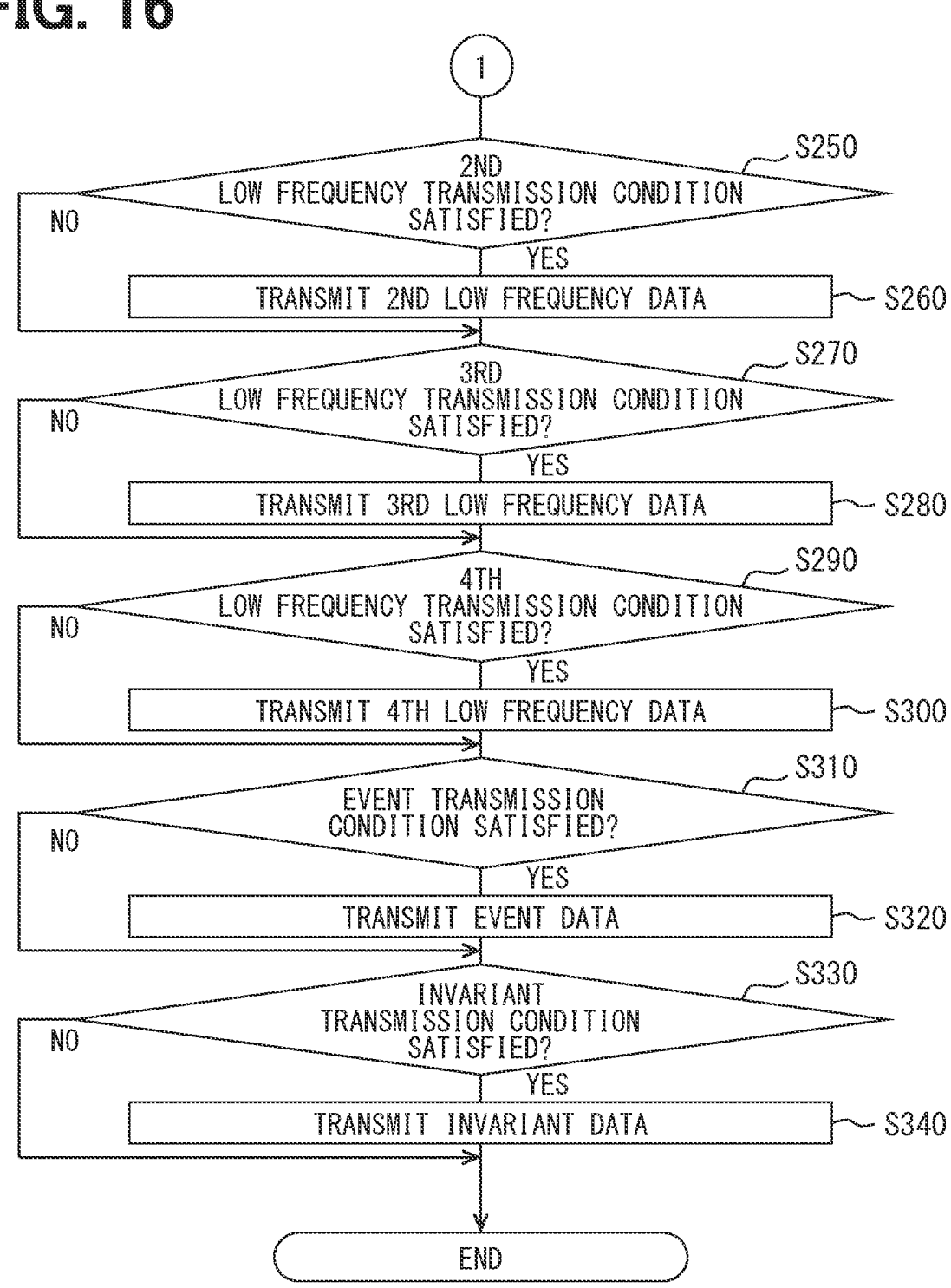
FIG. 16 is a flowchart illustrating a second half of the data transmission process.

When proceeding to S250, the second core 22 determines whether or not a preset second low frequency transmission condition is satisfied, as illustrated in FIG. 16. The second low frequency transmission condition is that mod $\{(tx+T)/(T\times120)\}$ is 0.

Here, in a case where the second low frequency transmission condition is not satisfied, the second core 22 proceeds to S270. On the other hand, in a case where the second low frequency transmission condition is satisfied, in S260, the second core 22 extracts the vehicle data set as the second low frequency data in the vehicle data constituting the standardized vehicle data from the standardized vehicle data storage unit 25*a*, transmits the vehicle data to the management center 3, and proceeds to S270.

When proceeding to S270, the second core 22 determines whether or not a preset third low frequency transmission condition is satisfied. The third low frequency transmission condition is that mod $\{tx/(T\times1200)\}$ is 0.

Here, in a case where the third low frequency transmission condition is not satisfied, the second core 22 proceeds to S290. On the other hand, in a case where the third low frequency transmission condition is satisfied, in S280, the second core 22 extracts the vehicle data set as the third low frequency data in the vehicle data constituting the standardized vehicle data from the standardized vehicle data storage unit 25*a*, transmits the vehicle data to the management center 3, and proceeds to S290.

When the process proceeds to S290, the second core 22 determines whether or not a preset fourth low frequency transmission condition is satisfied. The fourth low frequency transmission condition is that mod {(tx+T)/(T×1200)} is 0.

Here, in a case where the fourth low frequency transmission condition is not satisfied, the second core 22 proceeds to S310. On the other hand, in a case where the fourth low frequency transmission condition is satisfied, in S300, the second core 22 extracts the vehicle data set as the fourth low frequency data in the vehicle data constituting the standardized vehicle data from the standardized vehicle data storage unit 25a, transmits the vehicle data to the management center 3, and proceeds to S310.

When proceeding to S310, the second core 22 determines whether or not a preset event transmission condition is satisfied. The event transmission condition is that mod {tx/(T×172800)} is 0. Note that any one of the first to sixth high frequency conditions may be adopted as the event transmission condition.

Here, in a case where the event transmission condition is not satisfied, the second core 22 proceeds to S330. On the other hand, in a case where the event transmission condition is satisfied, in S320, the second core 22 extracts the vehicle data set as the event data in the vehicle data constituting the standardized vehicle data from the standardized vehicle data storage unit 25a, transmits the vehicle data to the management center 3, and proceeds to S330.

When proceeding to S330, the second core 22 determines whether or not a preset invariant transmission condition is satisfied. The invariant transmission condition is that the current process in S330 is the first process in S330 after the microcomputer 11 is activated.

Here, in a case where the invariant transmission condition is not satisfied, the second core 22 ends the data transmission process. On the other hand, in a case where the invariant transmission condition is satisfied, in S340, the second core 22 extracts the vehicle data set as the invariant data in the vehicle data constituting the standardized vehicle data from the standardized vehicle data storage unit 25a, transmits the vehicle data to the management center 3, and ends the data transmission process.

Figure 17:
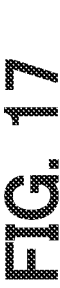
FIG. 17 is a timing chart illustrating a data transmission timing.

As illustrated in FIG. 17, assuming that a time t0 is the first transmission timing, the first high frequency data, the third high frequency data, the fifth high frequency data, the first low frequency data, the third low frequency data, the event data, and the invariant data are transmitted at the time t0.

The first high frequency data is transmitted every 1,000 ms from the time t0. In a case where data is divided into two, the data divided into two may be transmitted every 500 ms that is half the transmission cycle. Note that, in a case where other data is also divided into two, the data divided into two may be transmitted at a timing half the transmission cycle.

The second high frequency data is transmitted at a time t1 when 500 ms has elapsed from the time t0, and is then transmitted every 1,000 ms from the time t1.

The third high frequency data is transmitted every 4 s from the time t0. The fourth high frequency data is transmitted at a time t4 when 2 s has elapsed from the time t0, and is then transmitted every 4 s elapses from the time t4.

The fifth high frequency data is transmitted every 8 s from the time t0. The sixth high frequency data is transmitted at a time when 4 s has elapsed from the time t0, and is then transmitted every 8 s.

The first low frequency data is transmitted every minute from the time t0. The second low frequency data is transmitted at a time when 30 s has elapsed from the time t0, and is then transmitted every minute.

The third low frequency data is transmitted every ten minutes from the time t0. The fourth low frequency data is transmitted at a time when five minutes have elapsed from the time t0, and is then transmitted every ten minutes.

The event data is transmitted every 12 hours from the time t0. Note that the event data may be transmitted at the timing of transmitting the first to sixth high frequency data.

Figure 18:
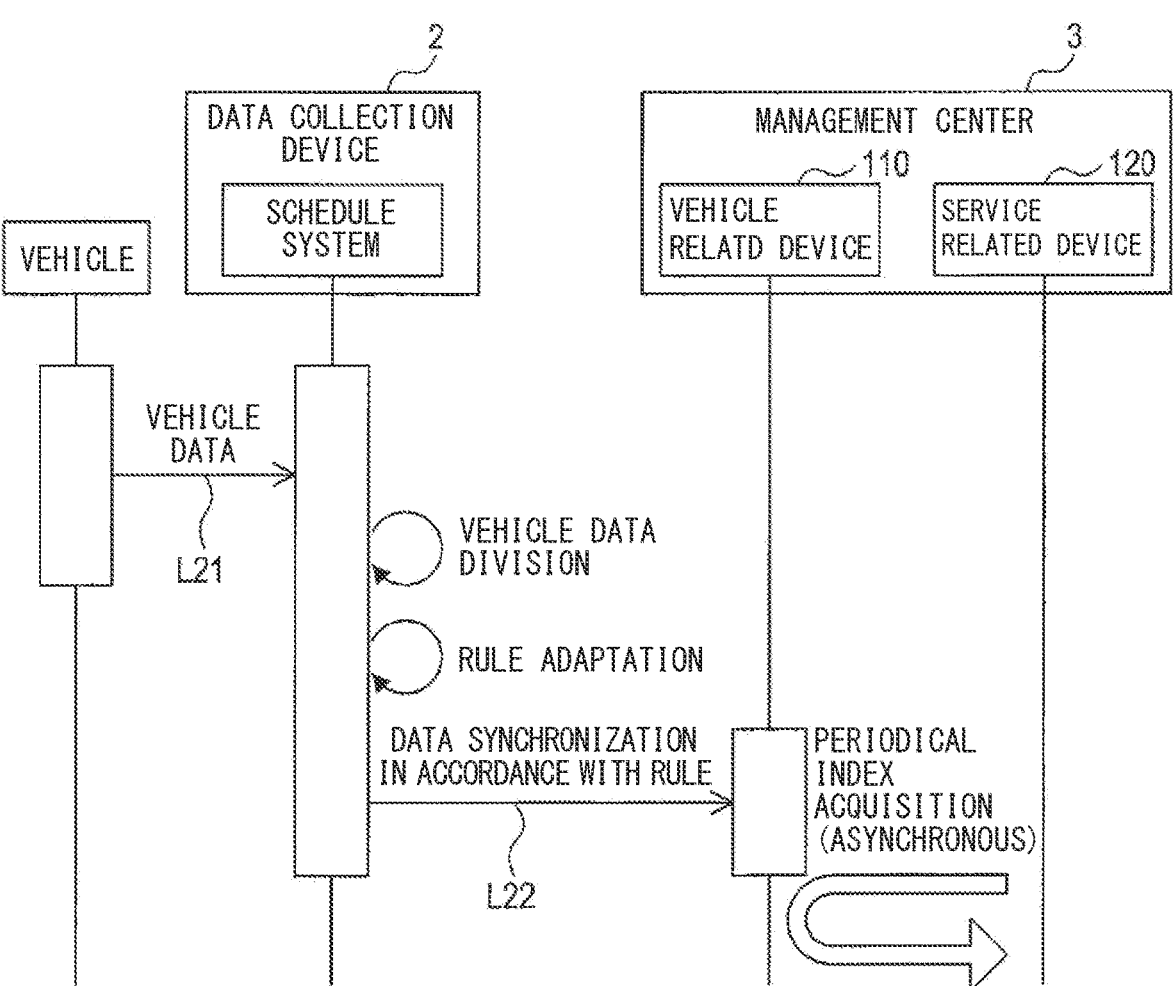
FIG. 18 is a sequence diagram illustrating a data flow in the mobility IoT system.

Here, the data flow between the vehicle, the data collection device 2, and the management center 3 will be collectively described using a sequence diagram illustrated in FIG. 18.

As indicated by an arrow L21, vehicle data is transmitted from each sensor and each electronic control device disposed in the vehicle to the scheduling system of the data collection device 2.

Specifically (see, for example, FIG. 26), the data collection device (that is, the edge device) 2 instructs the ECU 210 with a relay function to collect data by specifying which data is to be acquired from which ECU. The ECU 210 receives designated data transmitted from the designated ECU among data transmitted from the individual ECUs 220 via the in-vehicle communication network 250, and transmits the designated data to the data collection device 2. The data collection device 2 may request each ECU 220 to transmit data via the ECU 210 in such a manner that each ECU 220 transmits data. The data collection device 2 normalizes and semanticizes the received vehicle data to form standardized vehicle data with a layered structure.

The scheduling system sets the vehicle data transmission cycle in accordance with the rules described above. Furthermore, the vehicle data is divided as necessary.

As indicated by an arrow L22, the vehicle data is transmitted to the vehicle related device 110 of the management center 3 based on the set transmission cycle. Note that the scheduling system may transmit a divided part of the standardized vehicle data or may transmit all of the standardized vehicle data based on the set transmission cycle.

The vehicle related device 110 stores the received vehicle data in the second storage unit 33a. That is, the received vehicle data is stored in the second storage unit 33a in synchronization. Note that examples of the second storage unit 33a include the shadow storage unit 112 (see, for example, FIG. 20) and the like.

As will be described later, the service related device 120 includes the third storage unit 33b. In the service related device 120, the latest vehicle data generated from the vehicle data stored in the second storage unit 33a, that is, the latest index 118 (see, for example, FIG. 20) from which the vehicle data can be searched is acquired in a cycle different from that of the acquisition of the vehicle data in the second storage unit 33a, that is, asynchronously (for example, every second), and is stored in the third storage unit 33b. Note that the example of the third storage unit 33b includes the index storage unit 125 (see, for example, FIG. 20).

Note that the vehicle data transmitted from the data collection device 2 to the management center 3 has a data structure, and includes, for example, an example illustrated in FIG. 19.

In the vehicle data, "attributes" indicates attribute information, "firmware-version" indicates a firmware version, and "mobility-id-information" indicates information for specifying a vehicle. This "attributes" corresponds to the attribute information in FIG. 10.

Note that "mobility-id-information" is, for example, "vehicle-makers-serial-number" (that is, vehicle number), "vehicle-registration-no" (that is, license plate number), or "vin" (that is, vehicle identification number). This "mobility-id-information" corresponds to the vehicle identification information in FIG. 10.

In this manner, the data collection device 2 forms the vehicle data into the data structure illustrated in FIG. 10 or 19, and then transmits the vehicle data to the management center 3.

Note that the transmission data is compressed and base 64 encoded.

1-10. Configuration of Mobility GW and Data Management Unit

Figure 20:
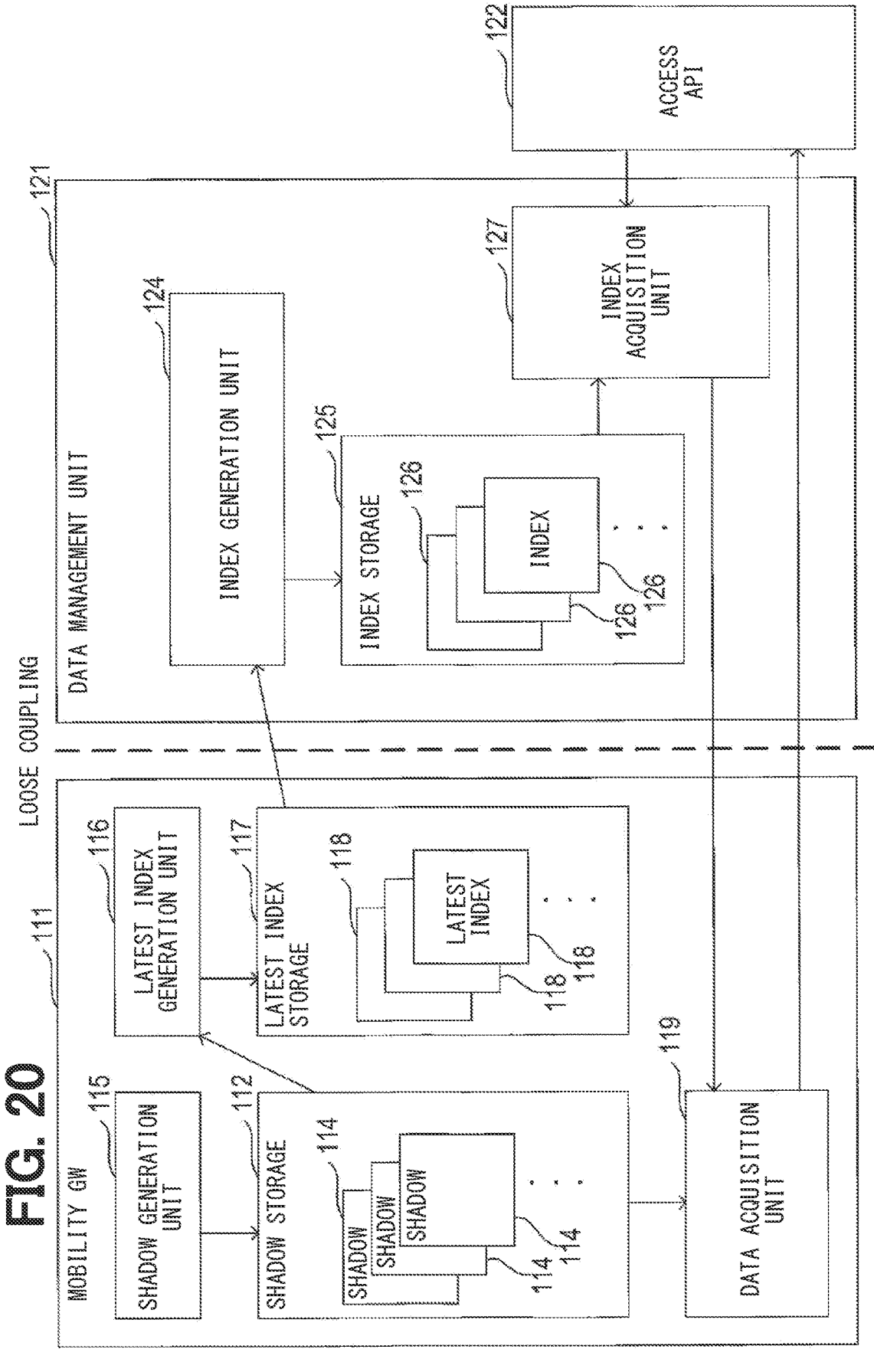
FIG. 20 is a functional block diagram illustrating functional configurations of a mobility GW and a data management unit.

As illustrated in FIG. 20, the mobility GW 111 includes a shadow generation unit 115, a latest index generation unit 116, and a latest index storage unit 117.

Every time vehicle data is transmitted from the data collection device 2 in a transmission cycle (that is, the first cycle) set based on the type of the vehicle data, the shadow generation unit 115 updates standardized vehicle data by overwriting the transmitted vehicle data over the corresponding area of the structured standardized vehicle data.

The shadow generation unit 115 then generates a new shadow 114 using the updated standardized vehicle data. The shadow generation unit 115 stores the generated shadow 114 in the shadow storage unit 112. As a result, the shadow storage unit 112 stores multiple shadows 114 with different generation times for each vehicle.

The shadow generation unit 115 receives the standardized vehicle data formed in the layered structure from the data collection device 2. The shadow generation unit 115 may receive layered structure data of a part of the standardized vehicle data. When generating a new shadow 114 using the updated standardized vehicle data, the shadow generation unit 115 may assign arbitrary information such as a serial number to the shadow and store the information in the shadow storage unit 112.

One shadow 114 is a vehicle data group of a certain vehicle at a predetermined time, and includes a vehicle data group represented by the standardized data structure illustrated in FIG. 10. Note that, although the timing at which the shadow generation unit 115 receives the structured standardized vehicle data via the communication unit 32 varies depending on the vehicle, the new shadow may be generated at the same timing for all the vehicles. The shadow generation unit 115 may generate a new shadow for all the vehicles in a constant cycle. The past shadow is accumulated in the shadow storage unit 112 for each vehicle. The shadows 114 after a certain period may be sequentially deleted.

As a result, the standardized vehicle data is overwritten (that is, updated) in the first cycle, and the sequentially updated standardized vehicle data is stored in the shadow storage unit 112 as the shadow 114. That is, the vehicle data stored in the shadow 114 is updated based on the time. Note that, in the case of vehicle data with a long transmission cycle, a value of the vehicle data received last time is stored in the shadow 114.

Note that the following configuration may be adopted.

In the cloud, the shadow 114 does not need to be generated at the timing at which the vehicle data is received from the data collection device 2 (that is, in the first cycle), and may be generated in a third cycle not related to the first cycle.

In addition, since data is transmitted from the data collection device 2 in a transmission cycle of each vehicle data, the shadow 114 is generated each time in the embodiment described above, but the shadow 114 may be generated at a timing not related to the timing at which the vehicle data is received (that is, in the third cycle).

The vehicle data received from the data collection device 2 may be stored in a free area of the shadow storage unit 112 in the structure of the standardized vehicle data (for example, as a temporary shadow), and the shadow 114 to which shadow-version or the like is assigned may be generated at the timing of the third cycle and stored in the shadow storage unit 112.

Note that the third cycle is set shorter than the second cycle, but may be the same as the second cycle or longer than the second cycle. Note that data is transmitted from the shadow 114 to an index 126 in the second cycle.

As illustrated in FIG. 21, the shadow 114 includes a vehicle data storage unit 114*a* and a device data storage unit 114*b*.

The vehicle data storage unit 114*a* stores "object-id", "Shadow_version", and "mobility-data" as data related to the vehicle on which the data collection device 2 is mounted.

"object-id" is a number for identifying the vehicle. For example, multiple shadows 114 corresponding to a certain vehicle have the same "object-id". Note that in a case where vehicle data of a certain vehicle is first received by the management center 3, "object-id" is assigned to identify the vehicle.

"Shadow_version" is a numerical value indicating the version of the shadow 114, and a timestamp indicating the time when the shadow is generated is set every time the shadow 114 is generated.

"mobility-data" is the standardized vehicle data described above.

The device data storage unit 114*b* stores "object-id", "update_time", "version", "power_status", "power_status_timestamp", and "notify_reason" as data related to hardware and software installed in the data collection device 2. These pieces of information are transmitted from the data collection device 2 when a change occurs, separately from the standardized vehicle data.

"object-id" is a character string for identifying the vehicle on which the data collection device 2 is mounted, and functions as a partition key.

"update_time" is a numerical value indicating an update time.

"version" is a character string indicating the version of hardware and software of the data collection device 2.

"power_status" is a character string indicating the system status (for example, OFF, ON, and the like) of the data collection device 2.

"power_status_timestamp" is a numerical value indicating the notification time of the system status.

"notify_reason" is a character string indicating a notification reason.

As described above, the shadow 114 includes information of the data collection device 2 in addition to the vehicle data group. Note that the device data storage unit 114*b* may store the information of the data collection device 2 in the ROM 42 separately without including the information of the data collection device 2 in the shadow. For the information of the data collection device 2, the device data storage unit 114*b* may store only the latest data in the ROM 42 instead of accumulating the past data for each timestamp.

The latest index generation unit 116 acquires the latest shadow 114 for each vehicle from the shadow storage unit 112, and generates the latest index 118 (for example, also referred to as "first index") using the acquired shadow 114. The latest index generation unit 116 stores the generated latest index 118 in the latest index storage unit 117. The latest index storage unit 117 stores one latest index 118 for each vehicle.

The latest index 118 and the index 126 to be described later are parameter information serving as a key when the shadow 114 is searched in the shadow storage unit 112. That is, the latest index 118 and the index 126 are constituted by a part of vehicle data (that is, standardized vehicle data) and are data associated with the vehicle data. Note that the latest index 118 is parameter information based on the latest vehicle data. The latest index generation unit 116 generates the latest index 118 by using the vehicle data acquired from the data collection device 2 or by generating data by itself.

That is, since the vehicle data stored in the shadow storage unit 112 is updated every first cycle as described above, the latest index 118 for each vehicle is stored in the latest index storage unit 117 every first cycle.

As illustrated in FIG. 22, the latest index 118 stores "gateway-id", "object-id", "shadow-version", "vin", "location-lon", "location-lat", and "location-alt".

"gateway-id" is information for identifying the mobility GW 111.

"object-id" is information for identifying the vehicle on which the data collection device 2 is mounted.

"shadow-version" corresponds to "Shadow_version" of the shadow 114. That is, "shadow-version" is information for identifying the shadow 114, and the timestamp is set therein.

"vin" is a registration number unique to the vehicle on which the data collection device 2 is mounted.

"location-lon" is information indicating the longitude at which the vehicle having the data collection device 2 mounted thereon is present.

"location-lat" is information indicating the latitude at which the vehicle having the data collection device 2 mounted thereon is present.

"location-alt" is information indicating the altitude at which the vehicle having the data collection device 2 mounted thereon is present.

As illustrated in FIG. 20, the data management unit 121 includes an index generation unit 124 and an index storage unit 125.

The index generation unit 124 acquires the latest index 118 from the latest index storage unit 117 every predetermined cycle (that is, every second cycle different from the first cycle), that is, periodically (for example, every second), and generates the index 126 (for example, also referred to as "second index") using the acquired latest index 118. The index generation unit 124 then stores the generated index 126 in the index storage unit 125. As a result, the index storage unit 125 stores multiple indexes 126 with different generation times for each vehicle.

That is, since the index 126 stored in the index storage unit 125 is generated every second cycle as described above, the index 126 for each vehicle is stored in the index storage unit 125 every second cycle. In this manner, the index 126 is updated every second cycle.

As illustrated in FIG. 23, the index 126 stores "timestamp", "schedule-type", "gateway-id", "object-id", "shadow-version", "vin", "location", and "alt".

"timestamp" is a timestamp indicating a time in milliseconds.

"schedule-type" indicates whether the scheduler of the data generation source is periodic or an event. In a case where the scheduler is periodic, "schedule-type" is set to "Repeat", and in a case where the scheduler is an event, "schedule-type" is set to "Event".

"gateway-id" is information for identifying the mobility GW 111. "object-id" is information for identifying the vehicle on which the data collection device 2 is mounted.

"shadow-version" is a timestamp of the gateway, and is information for identifying the shadow 114. "vin" is a registration number unique to the vehicle on which the data collection device 2 is mounted.

"location" is information indicating the latitude and longitude at which the vehicle on which the data collection device 2 is mounted is present. "alt" is information indicating the altitude at which the vehicle having the data collection device 2 mounted thereon is present.

The latest index generation unit 116 and the latest index storage unit 117 do not need to be provided, and the index generation unit 124 may acquire the shadow 114 stored in the shadow storage unit 112 and generate the index 126. Preferably, the index generation unit 124 generates the index 126 by using the latest index 118 acquired from the latest index storage unit 117. This is one of configurations in which the mobility GW 111 and the data management unit 121 are loosely coupled.

In addition, the index generation unit 124 and the index storage unit 125 do not need to be provided. For example, an index acquisition unit 127 may request the data acquisition unit 119 to acquire the designated vehicle data by using object-id and the timestamp (for example, shadow-version) designated from the access API 122.

Here, the flow of process executed in the mobility GW 111 and the data management unit 121 described above will be collectively described.

Figures 24A, 24B:
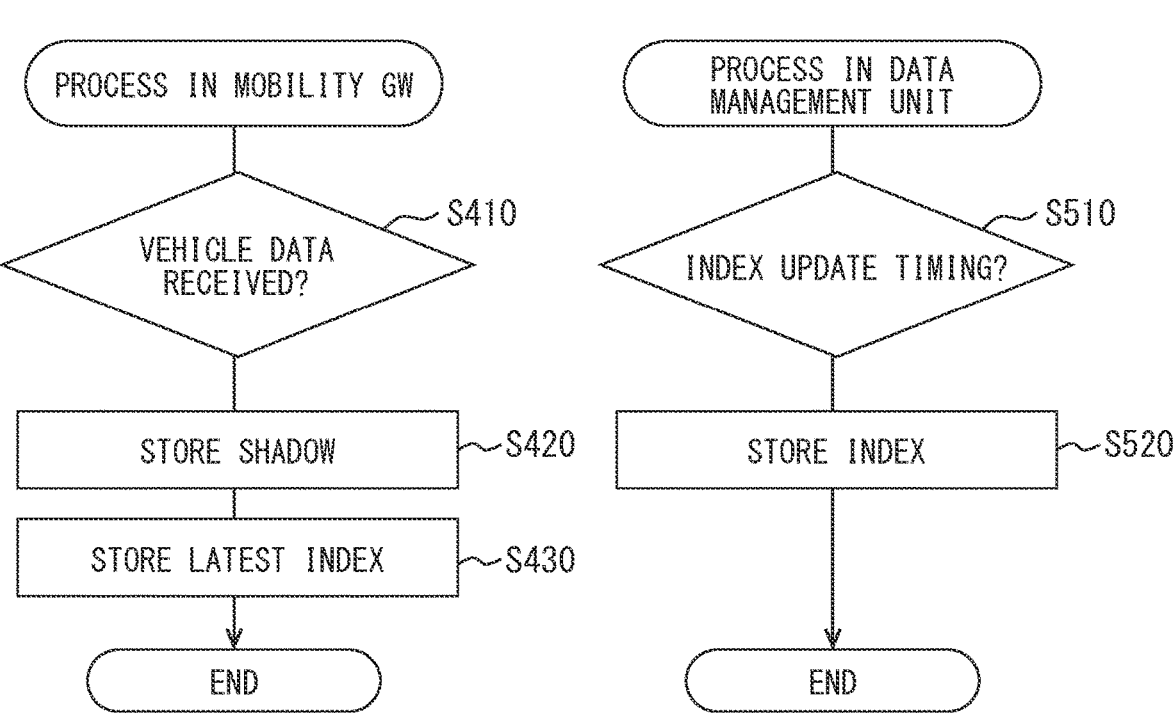
FIG. 24A is a flowchart illustrating process executed in the mobility GW.
FIG. 24B is a flowchart illustrating process executed in the data management unit.

As illustrated in FIG. 24A, the mobility GW 111 determines whether or not vehicle data is received in S410. When an affirmative determination is made, the process proceeds to S420. On the other hand, when a negative determination is made, the process is temporarily ended.

In S420, the standardized vehicle data is overwritten on the basis of the received vehicle data, and the shadow 114 is generated and stored in the shadow storage unit 112.

In the following S430, the latest index 118 is generated on the basis of the shadow 114 and stored in the latest index storage unit 117, and the process is temporarily ended.

On the other hand, as illustrated in FIG. 24B, in S510, the data management unit 121 determines whether or not it is a constant timing (that is, the second cycle for updating the index 126) to generate and store the index 126. When an affirmative determination is made, the process proceeds to S520. On the other hand, when a negative determination is made, the process is temporarily ended.

In S520, the index 126 is generated on the basis of the latest index 118 stored in the latest index storage unit 117 and is stored in the index storage unit 125, and the process is temporarily ended.

As illustrated in FIG. 20, the mobility GW 111 includes the data acquisition unit 119. The data management unit 121 includes the index acquisition unit 127.

The index acquisition unit 127 provides the index 126 capable of specifying the shadow 114 in order to acquire the vehicle data corresponding to the designated parameter from the shadow 114.

When receiving a request to instruct acquisition of designated data of the designated vehicle at the designated time from the access API 122, the index acquisition unit 127 acquires the index 126 corresponding to the designated time and the designated vehicle in the received request from the index storage unit 125.

The index acquisition unit 127 determines the shadow 114 specified on the basis of the acquired index 126 as the designated shadow, and transmits a request to instruct acquisition of designated data in the designated shadow to the data acquisition unit 119. Specifically, since the shadow 114 is uniquely determined by "object-id" and "shadow-version", the index acquisition unit 127 requests the data acquisition unit 119 to acquire the designated data using "object-id" and "shadow-version".

When receiving the request from the index acquisition unit 127, the data acquisition unit 119 extracts designated data from the designated shadow indicated by the received request, and transmits the extracted designated data to the access API 122.

The extracted designated data may be transmitted to the access API 122 via the index acquisition unit 127.

In order to acquire the designated data of the designated vehicle at the designated time, the access API 122 may acquire the corresponding index 126 from the index storage unit 125 via the index acquisition unit 127, and request the data acquisition unit 119 to acquire the designated data using the acquired index 126 (for example, object-id and shadow-version).

Requests RQ1, RQ2, and RQ3 illustrated in FIG. 25 are specific examples of requests transmitted from the service providing server 4 to the access API 122. In other words, the access API 122 is an API for acquiring vehicle data provided to the service providing server 4.

The request RQ1 is a request to instruct the vehicle whose "object-id" is "dt-000002" and the vehicle whose "object-id" is "dt-000008" to acquire the latitude (that is, data in which "item-names" is "latitude") for ten seconds from 5:17 10.5, Aug. 27, 2019.

The index acquisition unit 127 acquires "shadow-version" that can specify the shadow 114 corresponding to "object-id" and the time information from the index storage unit 125 via the access API 122 that has received the request RQ1. The index acquisition unit 127 then instructs the data acquisition unit 119 to acquire "latitude" corresponding to "object-id" and "shadow-version". The data acquisition unit 119 acquires the corresponding vehicle data from the shadow storage unit 112, and the vehicle data is transmitted to the access API 122.

The request RQ2 is a request to instruct acquisition of the latitude of the vehicle present for ten seconds from 5:17 10.5, Aug. 27, 2019 in a rectangular area specified by the upper left point specified by the longitude represented by 135.8974670767784 and the altitude represented by 36.16643474082275 and the lower right point specified by the longitude represented by 139.7863560656673 and the altitude represented by 35.05532363071164.

The index acquisition unit 127 acquires the "object-id" list of vehicles present in the designated area at the designated time from the index storage unit 125 via the access API 122 that has received the request RQ2, and acquires "shadow-version" of the corresponding "object-id" at the designated time. The index acquisition unit 127 then instructs the data acquisition unit 119 to acquire "latitude" corresponding to "object-id" and "shadow-version". The data acquisition unit 119 acquires the corresponding vehicle data from the shadow storage unit 112, and the vehicle data is transmitted to the access API 122.

The request RQ3 is a request to instruct the vehicle whose "object-id" is "dt-000002" and the vehicle whose "object-id" is "dt-000008" to acquire information of all items in the category "ADAS/AD" at 5:17 10.5, Aug. 27, 2019.

The index acquisition unit 127 acquires "shadow-version" that can specify the shadow 114 corresponding to "object-id" and the time information from the index storage unit 125 via the access API 122 that has received the request RQ3. The index acquisition unit 127 then instructs the data acquisition unit 119 to acquire information of all items in the category "ADAS/AD" corresponding to "object-id" and "shadow-version". The data acquisition unit 119 acquires the corresponding vehicle data from the shadow storage unit 112, and the vehicle data is transmitted to the access API 122.

In the management center 3 with the above configuration, as indicated by an arrow L1 in FIG. 5, the service providing server 4 accesses the digital twin 123 of the data management unit 121 via the access API 122, thereby specifying the shadow 114 corresponding to the designated vehicle.

As indicated by an arrow L2 in FIG. 5, the service providing server 4 transmits a control instruction including the designated shadow and the control content to the vehicle control unit 113 of the mobility GW 111.

As a result, the vehicle control unit 113 transmits a control instruction to the data collection device 2 of the vehicle corresponding to the designated shadow. When the control instruction is received by the data collection device 2, control based on the control instruction is executed in the vehicle on which the data collection device 2 is mounted.

1-11. Effects (1a) The mobility IoT system 1 of the first embodiment includes multiple data collection devices 2 individually mounted on multiple vehicles, and the management center 3 capable of performing data communication with the multiple data collection devices 2.

The data collection device 2 is configured to store vehicle data transmitted from another device in the vehicle on which the data collection device 2 is mounted in, for example, the flash memory 25. In addition, for example, the second core 22 is configured to transmit the vehicle data to the management center 3 in the first cycle.

The management center 3 is configured to store the vehicle data sequentially transmitted from the data collection device 2 in the shadow storage unit 112 as, for example, the shadow 114, and store the latest index 118 including a part of the vehicle data and associated with the vehicle data in the latest index storage unit 117. In addition, the index 126 generated from the latest index 118 is configured to be stored in the index storage unit 125.

When receiving the vehicle data transmitted from the data collection device 2, the management center 3 updates the shadow 114 stored in the shadow storage unit 112 and the latest index 118 stored in the latest index storage unit 117 using the received vehicle data. In addition, the index 126 stored in the index storage unit 125 is updated using the latest index 118 in a second cycle (for example, a constant cycle) that does not require synchronization with the timing of updating the vehicle data.

As a result, in the mobility IoT system 1, the index 126 stored in the index storage unit 125 can be updated in the second cycle different from the first cycle in which the vehicle data is transmitted, so that the calculation load of the management center 3 can be reduced. For example, by setting the second cycle to a cycle longer than the first cycle set to transmit the vehicle data with a high frequency, it is possible to reduce the calculation load of the management center 3.

In addition, in a case where vehicle data is used in the mobility service, the index 126 that enables the vehicle data to be extracted can be updated at an appropriate timing (that is, in the second cycle), so that the calculation load of the management center 3 can be reduced also in this respect.

Note that vehicle control unit 113 may acquire a control instruction from the service providing server 4 via the access API 122 of the service related device 120. Providing the access API 122 in the service related device 120 and providing the vehicle control unit 113 in the vehicle related device 110 are also one of the configurations in which the two units are loosely coupled.

(1b) The mobility IoT system 1 of the first embodiment can provide the vehicle data stored in the shadow storage unit 112 to the service providing server 4 by using the index 126 stored in the index storage unit 125 in response to a request from the service providing server 4 capable of performing data communication with the mobility IoT system.

(1c) In a case where the vehicle data is transmitted to the management center 3 in the first cycle, when there are vehicle data with a high update frequency and vehicle data with a low update frequency, the mobility IoT system 1 of the first embodiment can set the transmission cycle of the vehicle data with a high update frequency to be shorter than the transmission cycle of the vehicle data with a low update frequency. Details will be described below.

In order to manage a vehicle state and immediately reflect the vehicle state on the cloud, it is conceivable to transmit vehicle data from the vehicle side to the side of the management center 3 at regular intervals. However, the vehicle data includes data that does not change much and does not need to be updated much, data that changes largely and is desirably updated frequently, attribute data that does not change once synchronized, and the like.

When vehicle data is continuously transmitted, the amount of data increases, and the amount of communication and the data management cost increase accordingly. In addition, a stable communication environment is required to transmit a large volume of data, but the vehicle environment changes drastically, and it is difficult to maintain stable communication.

Therefore, in the first embodiment, an appropriate transmission cycle is determined based on the type of vehicle data. That is, the transmission cycle of the vehicle data with a high update frequency is set to be shorter than the transmission cycle of the vehicle data with a low update frequency. As a result, the amount of transmission data can be reduced as much as possible.

That is, in the first embodiment, since the frequency of updating vehicle state data can be optimized for each vehicle data by the scheduling function described above, the data amount and the communication overhead can be reduced.

Note that, in the first embodiment described above, the mobility IoT system 1 corresponds to a system, the management center 3 corresponds to a center, the data collection device 2 corresponds to an in-vehicle device, the service providing server 4 corresponds to a service providing unit, the communication unit 13 corresponds to a communication unit, the second core 22 corresponds to a transmission control unit, the flash memory 25 corresponds to a first storage unit, the communication unit 32 corresponds to a communication unit, the second storage unit 33a corresponds to a second storage unit, the third storage unit 33b corresponds to a third storage unit, the mobility GW 111 corresponds to a first update unit, and the data management unit 121 corresponds to a second update unit.

Modification

Note that, in addition to the example described above, for example, even if the latest index 118 is not provided in advance, the data management unit 121 (that is, the second update unit) may search for the shadow 114 stored in the shadow storage unit 112 (that is, the second storage unit 33a), extract the data corresponding to the latest index 118, and update the data (that is, the index 126) stored in the index storage unit 125 (that is, the third storage unit 33b). Note that the mobility IoT system 1 (for example, the management center 3) may have the function of the service providing server 4.

2. Second Embodiment

Next, a second embodiment will be described.

Since the basic configuration of the second embodiment is similar to that of the first embodiment, differences from the first embodiment will be mainly described below. Note that the same reference numerals as those in the first embodiment indicate the same configurations, and reference is made to the preceding description.

In the second embodiment, in the management center 3, the service providing server 4 communicates with another external service server 201 to acquire necessary external data (for example, weather or traffic condition data).

2-1. Configuration

Figure 27:
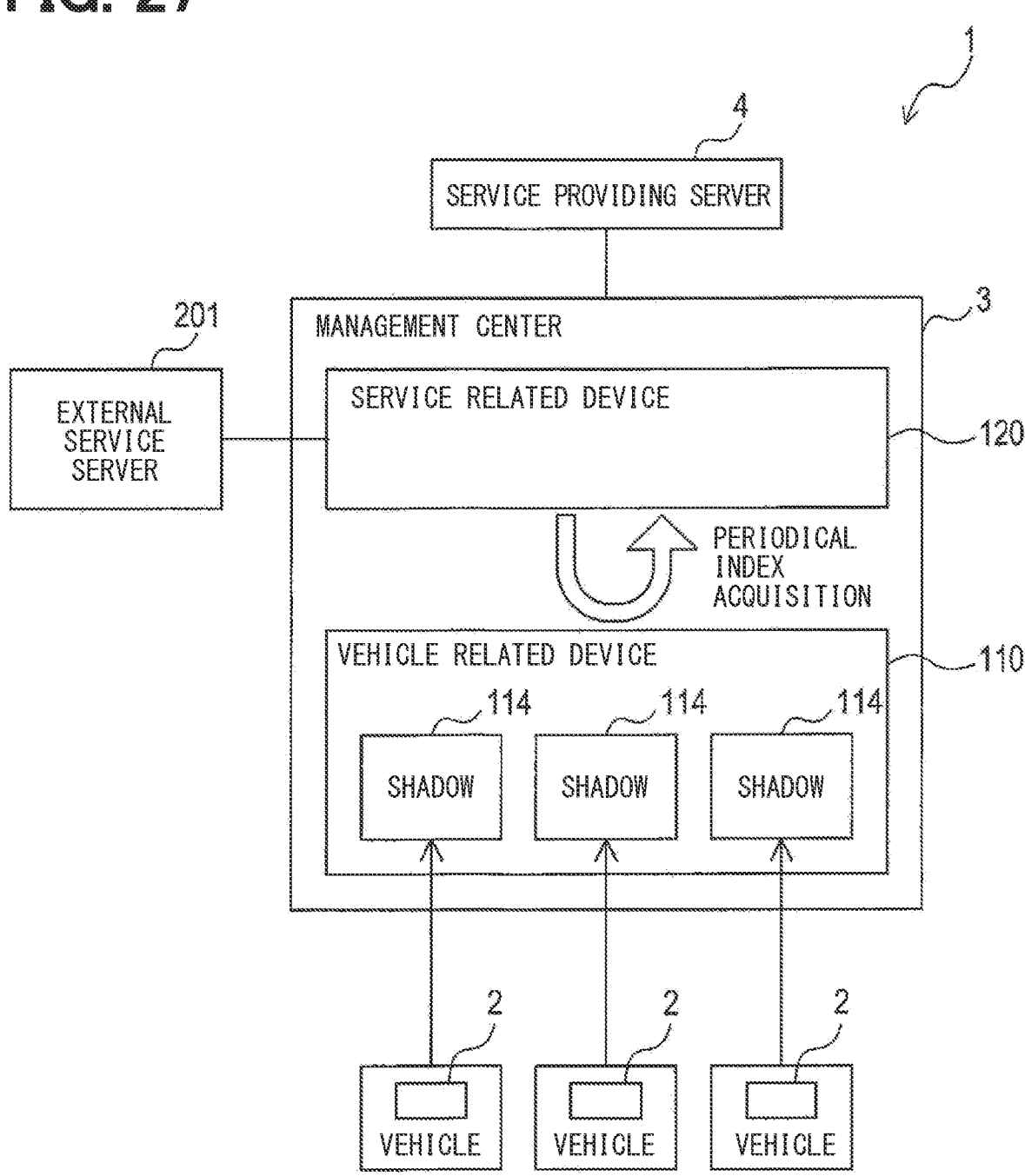
FIG. 27 is a block diagram illustrating a configuration of a mobility IoT system according to a second embodiment.

As illustrated in FIG. 27, in the second embodiment, the mobility IoT system 1 includes the management center 3 and the service providing server 4 as in the first embodiment. The management center 3 includes the service related device 120 and the vehicle related device 110. Each data collection device 2 is mounted on each vehicle.

In particular, in the second embodiment, the external service server 201 is data-communicably connected to the management center 3. The external service server 201 is a server that can supply weather information such as rain and information such as a traffic jam situation on a road (for example, information other than vehicle data).

Therefore, in the mobility IoT system 1, on the basis of a request from the management center 3, it is possible to acquire weather information such as rain (that is, weather information), information of a traffic jam situation on a road (that is, congestion information), and the like from the external service server 201.

Note that, also in the second embodiment, the management center 3 can acquire vehicle data from the data collection device 2 in the first cycle. The side of the service related device 120 can acquire the latest index 118 from the vehicle related device 110 in the second cycle different from the first cycle (for example, at regular time intervals).

2-2. Service Related Device

Figure 28:
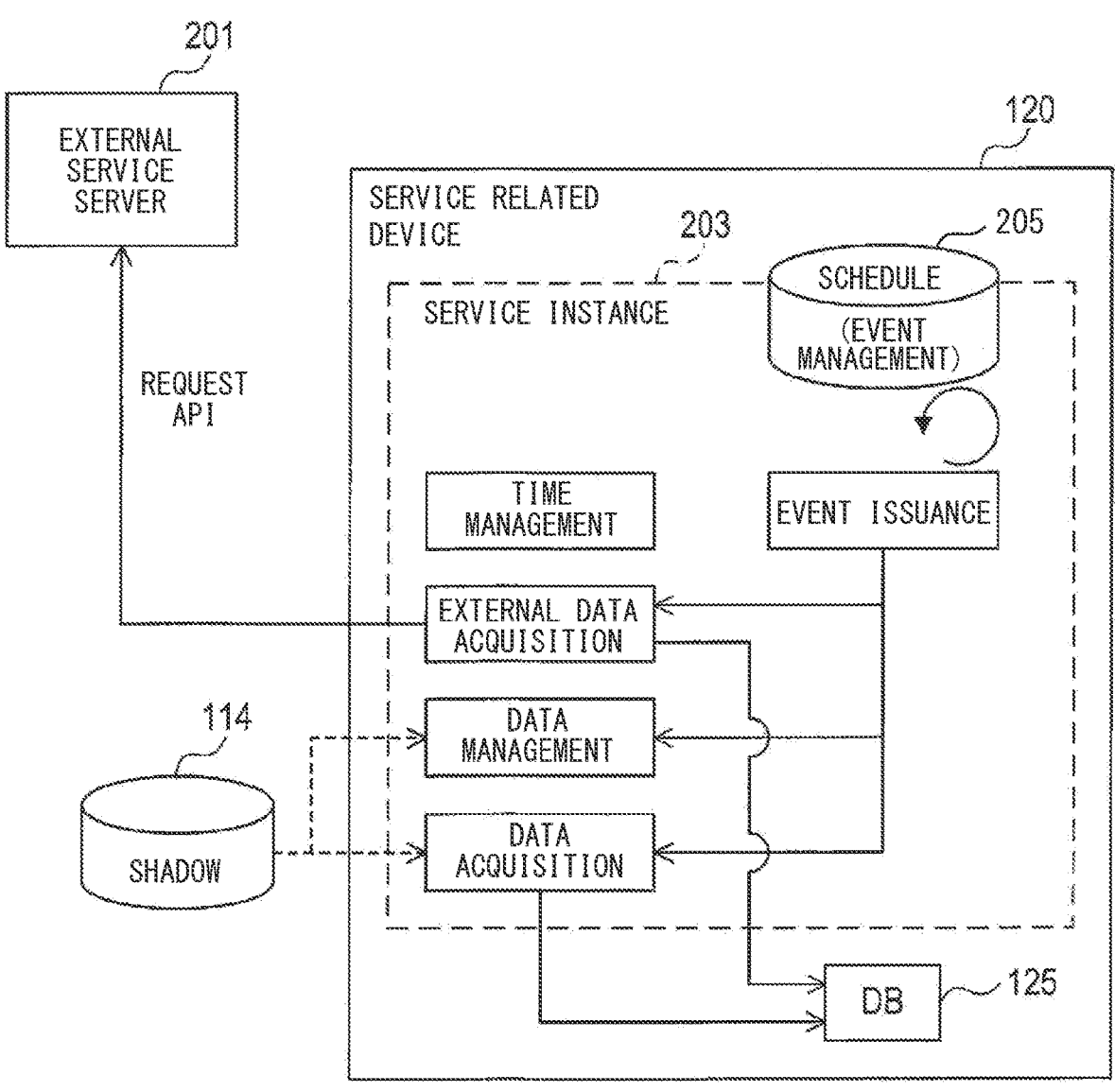
FIG. 28 is a functional block diagram functionally illustrating a configuration of a service related device.

As illustrated in FIG. 28, a service instance 203 of the service related device 120 performs time management, and issues an event to instruct a predetermined operation every predetermined period on the basis of information of a database 205 (that is, DB) that manages the event.

The service related device 120 acquires the latest index 118 generated from the vehicle data included in each shadow 114 on the basis of this event, as in the first embodiment. The index 126 is then generated from the latest index 118 and stored in the index storage unit 125 (that is, DB).

In addition, the service related device 120 acquires external data on the basis of the event. That is, the service related device 120 requests the external service server 201 for weather information and congestion information via the API, thereby acquiring the weather information and the congestion information.

Note that the weather information includes information indicating which range (for example, a rectangular range defined by latitude and longitude) is the range of rain at a certain time. Similarly, the congestion information includes information indicating which range is the range of congestion at a certain time.

The weather information and the congestion information are stored in the index storage unit 125 in association with the index 126 of the vehicle data, for example.

Figures 29, 30:
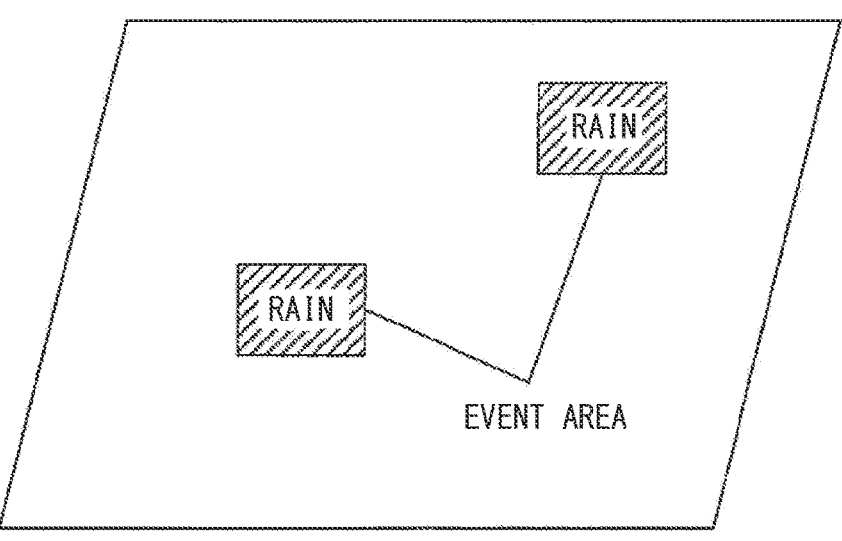
FIG. 29 is a diagram illustrating a configuration of an index including data other than vehicle data.
FIG. 30 is a diagram illustrating an area where the vehicle travels and the range of rain.

FIG. 29 illustrates a configuration of an index (hereinafter, "composite index") associated with weather information and congestion information.

In the composite index, information related to "event" is stored, as well as the information of "object-id" (that is, vehicle ID), "location" (that is, the planar position of the vehicle), "alt" (that is, the height of the vehicle), and "timestamp" (that is, the time), which have been described above.

The information related to "event" indicates the rectangular range of the event. For example, as illustrated in FIG. 30, the range of rain is indicated by a rectangle on a plane indicating the ground.

2-3. Operation

Next, an overall operation in the mobility IoT system 1 of the second embodiment will be described.

Figure 31:
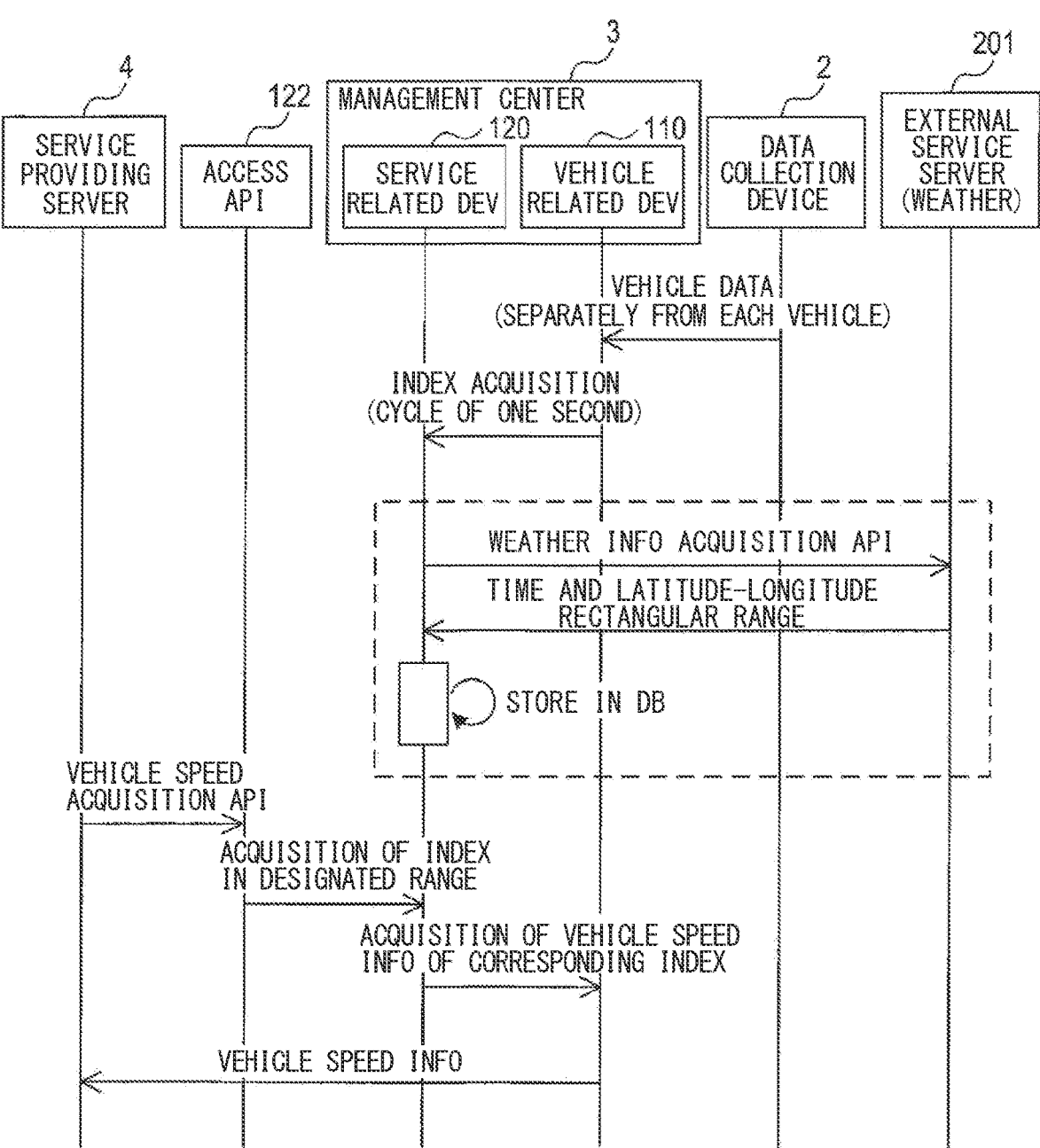
FIG. 31 is a sequence diagram illustrating a data flow in the second embodiment.

As illustrated in FIG. 31, each vehicle data is separately transmitted from the data collection device 2 to the vehicle related device 110 in the first cycle.

The service related device 120 can acquire the latest index 118 from the vehicle related device 110 in the second cycle different from the first cycle.

In addition, the service related device 120 requests the external service server 201 for weather information or the like at a predetermined event issuance timing.

The external service server 201 transmits weather information or the like to the service related device 120 in response to the request.

The service related device 120 stores the latest index 118 acquired from the vehicle related device 110, the weather information or the like acquired from the external service server 201 in association with each other. That is, the composite index illustrated in FIG. 29 is generated and stored in, for example, the index storage unit 125.

Here, in a case where, for a vehicle traveling in rain in a certain area at a certain time, there is a request for a vehicle speed from the service providing server 4 via the access API 122, for example, a corresponding composite index is extracted from the index storage unit 125 of the service related device.

Next, on the basis of the composite index, the shadow storage unit 112 of the vehicle related device 110 is accessed, a vehicle and a vehicle speed satisfying the conditions are extracted from the shadow 114 of the shadow storage unit 112, and information of the vehicle speed is transmitted to the service providing server 4.

As a result, the service providing server 4 can acquire information of the vehicle speed that satisfies the target condition.

2-4. Effects

In the second embodiment, effects similar to those of the first embodiment are obtained.

In the second embodiment, data other than vehicle data is stored in association with (that is, in an integrated manner,) the index (that is, the composite index) 126 stored in the third storage unit 33b. Note that the data other than the vehicle data is data supplied from another external server (that is, the external service server 201) other than the service providing server 4.

That is, in the second embodiment, a composite index to which weather information and traffic congestion information acquired from the external service server 201 are added is generated as the index 126 of the vehicle data.

Therefore, in the second embodiment, it is possible to provide a more advanced service in response to a request from the service providing server 4.

For example, even if the service provider does not directly access the vehicle, only by designating, for example, the yin, time, and location (that is, latitude and longitude) of the vehicle from which the data is desired, the service provider can acquire the vehicle data corresponding to the condition and easily provide the service.

For example, by setting the time, the range of a location, and event (for example, the range of rain) with the API, the service provider can acquire the vehicle data only from vehicles in a rain area within the predetermined range of the location at that time.

3. Other Embodiments

Although the embodiments of the present disclosure have been described above, the present disclosure is not limited to the above embodiments, and various modifications can be made.

The configuration and the method of controlling the system and the center described in the present disclosure may be implemented by a dedicated computer provided by configuring a processor and a memory programmed to perform one or multiple functions embodied by a computer program. Alternatively, the configuration and the method of controlling the system and the center described in the present disclosure may be implemented by a dedicated computer provided by configuring a processor with one or more dedicated hardware logic circuits. Alternatively, the configuration and the method of controlling the system and the center described in the present disclosure may be implemented by one or more dedicated computers configured by a combination of a processor and a memory programmed to perform one or multiple functions and a processor configured with one or more hardware logic circuits.

The computer program may be stored in a computer-readable non-transition tangible storage medium as an instruction performed by a computer. The method of implementing the functions of the units included in the system does not necessarily include software, and all the functions may be implemented using one or multiple pieces of hardware.

Multiple functions of one component in each of the above embodiments may be implemented by multiple components, or one function of one component may be implemented by multiple components. In addition, multiple functions of multiple components may be implemented by one component, or one function implemented by multiple components may be implemented by one component. A part of the configuration of each of the above embodiments may be omitted. At least a part of the configuration of each of the above embodiments may be added to or replaced with another configuration of each of the above embodiments.

The present disclosure can be implemented by various methods such as a method implemented by the system, a method implemented by the in-vehicle device, and a method implemented by the center, in addition to the system, the in-vehicle device, and the center described above. The present disclosure can be implemented in various forms such as a program for causing a computer to function as a system, an in-vehicle device, or a center, a non-transitory tangible storage medium such as a semiconductor memory having the program recorded therein, and a data management method.

What is claimed is:

1. A system comprising:

a plurality of in-vehicle devices individually mounted on a plurality of vehicles; and a center capable of performing data communication with the plurality of in-vehicle devices, wherein each of the plurality of in-vehicle devices includes:

a first storage unit that stores vehicle data transmitted from another device mounted on the corresponding vehicle; and a transmission control unit that transmits the vehicle data to the center in a first cycle, the center includes:

a second storage unit that stores the vehicle data sequentially transmitted from each of the plurality of in-vehicle devices;

a third storage unit that stores an index, the index including information associated with the vehicle data stored in the second storage unit;

a first update unit that updates the vehicle data stored in the second storage unit by adding the vehicle data that is received to the vehicle data stored in the second storage unit every time the vehicle data is transmitted from each of the plurality of in-vehicle devices; and a second update unit that performs an update by adding the index stored in the third storage unit in association with latest one of the vehicle data stored in the second storage unit in a second cycle, which does not require synchronization with an update timing of the first update unit, in a case where the vehicle data is transmitted to the center in the first cycle and the vehicle data includes high frequency data updated with a predetermined frequency and low frequency data updated with a frequency lower than the predetermined frequency, each of the plurality of in-vehicle devices sets the first cycle of the high frequency data to be shorter than the first cycle of the low frequency data, and the center acquires the latest one of the vehicle data from the second storage unit in a constant cycle, which is asynchronous with the first cycle, in order to update the index.

2. The system according to claim 1, wherein the second storage unit stores the vehicle data sequentially transmitted from each of the plurality of in-vehicle devices and the latest one of the vehicle data, which includes a part of the vehicle data and is associated with the vehicle data, the third storage unit stores the index of the vehicle data stored in the second storage unit, in response to receiving the vehicle data transmitted from each of the plurality of in-vehicle devices, the first update unit updates the vehicle data and the latest one of the vehicle data stored in the second storage unit using the received vehicle data, the second update unit updates the index stored in the third storage unit based on the latest one of the vehicle data stored in the second storage unit in the second cycle, and the second cycle does not require synchronization with an update timing of the vehicle data stored in the second storage unit.

3. The system according to claim 1, wherein, in response to receiving a request from a service providing unit that provides a service to the vehicle, the center acquires the vehicle data stored in the second storage unit using the index stored in the third storage unit and provides the acquired vehicle data to the service providing unit.

4. The system according to claim 1, wherein the center generates a shadow asynchronously with the first cycle using the vehicle data stored in the second storage unit.

5. The system according to claim 1, wherein the system stores data other than the vehicle data in association with the index stored in the third storage unit.

6. A center being capable of performing data communication with multiple in-vehicle devices individually mounted on multiple vehicles via communication units of respective vehicles, the center comprising:

a communication unit that receives vehicle data transmitted from each of the multiple in-vehicle devices in a first cycle;

a second storage unit that stores the vehicle data that is received;

a third storage unit that stores an index including information associated with the vehicle data stored in the second storage unit;

a first update unit that updates the vehicle data stored in the second storage unit by adding the vehicle data that is received to the vehicle data stored in the second storage unit every time the vehicle data is transmitted from each of the multiple in-vehicle devices; and a second update unit that performs an update by adding the index stored in the third storage unit in association with latest one of the vehicle data stored in the second storage unit in a second cycle, which does not require synchronization with an update timing of the first update unit, wherein in a case where the vehicle data is transmitted to the center in the first cycle and the vehicle data includes high frequency data updated with a predetermined frequency and low frequency data updated with a frequency lower than the predetermined frequency, each of the multiple in-vehicle devices sets the first cycle of the high frequency data to be shorter than the first cycle of the low frequency data, and the center acquires the latest one of the vehicle data from the second storage unit in a constant cycle, which is asynchronous with the first cycle, in order to update the index.

7. A computer-readable non-transitory storage medium storing a control program to be executed by a center, the center being capable of performing data communication with multiple in-vehicle devices individually mounted on multiple vehicles via communication units of respective vehicles, the control program comprising instructions to be executed by a computer of the center, the instructions comprising:

receiving vehicle data transmitted from each of the multiple in-vehicle devices in a first cycle;

storing the vehicle data that is received in a second storage unit;

storing, in a third storage unit, an index including information associated with the vehicle data stored in the second storage unit;

performing a first update by adding the vehicle data that is received to the vehicle data stored in the second storage unit every time the vehicle data is received; and performing a second update by adding the index stored in the third storage unit in association with latest one of the vehicle data stored in the second storage unit in a second cycle, which does not require synchronization with an update timing of the first update, wherein in a case where the vehicle data is transmitted to the center in the first cycle and the vehicle data includes high frequency data updated with a predetermined frequency and low frequency data updated with a frequency lower than the predetermined frequency, each of the multiple in-vehicle devices sets the first cycle of the high frequency data to be shorter than the first cycle of the low frequency data, and the center acquires the latest one of the vehicle data from the second storage unit in a constant cycle, which is asynchronous with the first cycle, in order to update the index.

8. A processing method executed by a system, the system including multiple in-vehicle devices individually mounted on multiple vehicles and a center capable of performing data communication with the multiple in-vehicle devices, the processing method comprising:

storing, in a first storage unit of each of the multiple in-vehicle devices, vehicle data transmitted from another device mounted on the corresponding vehicle;

transmitting the vehicle data from each of the multiple in-vehicle devices to the center in a first cycle;

storing, in a second storage unit of the center, the vehicle data sequentially transmitted from each of the multiple in-vehicle devices;

storing, in a third storage unit of the center, an index that includes information associated with the vehicle data stored in the second storage unit;

performing a first update by adding the vehicle data that is received to the vehicle data stored in the second storage unit of the center every time the vehicle data is transmitted from each of the multiple in-vehicle devices; and performing a second update by adding the index stored in the third storage unit in association with latest one of the vehicle data stored in the second storage unit in a second cycle, which does not require synchronization with an update timing of the first update, wherein in a case where the vehicle data is transmitted to the center in the first cycle and the vehicle data includes high frequency data updated with a predetermined frequency and low frequency data updated with a frequency lower than the predetermined frequency, each of the multiple in-vehicle devices sets the first cycle of the high frequency data to be shorter than the first cycle of the low frequency data, and the center acquires the latest one of the vehicle data from the second storage unit in a constant cycle, which is asynchronous with the first cycle, in order to update the index.

9. A processing method executed by a center, the center being capable of performing data communication with multiple in-vehicle devices individually mounted on multiple vehicles via communication units of respective vehicles, the processing method comprising:

receiving vehicle data transmitted, in a first cycle, from each of the multiple in-vehicle devices;

storing the vehicle data that is received in a second storage unit;

storing, in a third storage unit, an index that includes information associated with the vehicle data stored in the second storage unit;

performing a first update by adding the vehicle data that is received to the vehicle data stored in the second storage unit of the center every time the vehicle data is transmitted from each of the multiple in-vehicle devices; and performing a second update by adding the index stored in the third storage unit in association with latest one of the vehicle data stored in the second storage unit in a second cycle, which does not require synchronization with an update timing of the first update, wherein in a case where the vehicle data is transmitted to the center in the first cycle and the vehicle data includes high frequency data updated with a predetermined frequency and low frequency data updated with a frequency lower than the predetermined frequency, each of the multiple in-vehicle devices sets the first cycle of the high frequency data to be shorter than the first cycle of the low frequency data, and the center acquires the latest one of the vehicle data from the second storage unit in a constant cycle, which is asynchronous with the first cycle, in order to update the index.

10. The system according to claim 1, wherein the index includes at least one of a longitude, a latitude, or an altitude.

11. The center according to claim 6, wherein the index includes at least one of a longitude, a latitude, or an altitude.

12. The computer-readable non-transitory storage medium according to claim 7, wherein the index includes at least one of a longitude, a latitude, or an altitude.

13. The processing method according to claim 8, wherein the index includes at least one of a longitude, a latitude, or an altitude.

14. The processing method according to claim 9, wherein the index includes at least one of a longitude, a latitude, or an altitude.

15. The system according to claim 1, wherein the index is updated at an index update cycle and the index update cycle is set in relation to an update cycle of the vehicle data.

16. A system comprising:

a plurality of in-vehicle devices individually mounted on a plurality of vehicles; and a center capable of performing data communication with the plurality of in-vehicle devices, wherein each of the plurality of in-vehicle devices includes:

a first storage unit that stores vehicle data transmitted from another device mounted on the corresponding vehicle; and a transmission control unit that transmits the vehicle data to the center in a first cycle, the center includes:

a second storage unit that stores the vehicle data sequentially transmitted from each of the plurality of in-vehicle devices;

a third storage unit that stores an index, the index including information associated with the vehicle data stored in the second storage unit;

a first update unit that updates the vehicle data stored in the second storage unit by adding the vehicle data that is received to the vehicle data stored in the second storage unit every time the vehicle data is transmitted from each of the plurality of in-vehicle devices; and a second update unit that performs an update by adding the index stored in the third storage unit in association with latest one of the vehicle data stored in the second storage unit in a second cycle, which does not require synchronization with an update timing of the first update unit, and the index is updated at an index update cycle and the index update cycle is set in relation to an update cycle of the vehicle data.

17. A center being capable of performing data communication with multiple in-vehicle devices individually mounted on multiple vehicles via communication units of respective vehicles, the center comprising:

a communication unit that receives vehicle data transmitted from each of the multiple in-vehicle devices in a first cycle;

a second storage unit that stores the vehicle data that is received;

a third storage unit that stores an index including information associated with the vehicle data stored in the second storage unit;

a first update unit that updates the vehicle data stored in the second storage unit by adding the vehicle data that is received to the vehicle data stored in the second storage unit every time the vehicle data is transmitted from each of the multiple in-vehicle devices; and a second update unit that performs an update by adding the index stored in the third storage unit in association with latest one of the vehicle data stored in the second storage unit in a second cycle, which does not require synchronization with an update timing of the first update unit, wherein the index is updated at an index update cycle and the index update cycle is set in relation to an update cycle of the vehicle data.

18. A computer-readable non-transitory storage medium storing a control program to be executed by a center, the center being capable of performing data communication with multiple in-vehicle devices individually mounted on multiple vehicles via communication units of respective vehicles, the control program comprising instructions to be executed by a computer of the center, the instructions comprising:

receiving vehicle data transmitted from each of the multiple in-vehicle devices in a first cycle;

storing the vehicle data that is received in a second storage unit;

storing, in a third storage unit, an index including information associated with the vehicle data stored in the second storage unit;

performing a first update by adding the vehicle data that is received to the vehicle data stored in the second storage unit every time the vehicle data is received; and performing a second update by adding the index stored in the third storage unit in association with latest one of the vehicle data stored in the second storage unit in a second cycle, which does not require synchronization with an update timing of the first update, wherein the index is updated at an index update cycle and the index update cycle is set in relation to an update cycle of the vehicle data.

19. A processing method executed by a system, the system including multiple in-vehicle devices individually mounted on multiple vehicles and a center capable of performing data communication with the multiple in-vehicle devices, the processing method comprising:

storing, in a first storage unit of each of the multiple in-vehicle devices, vehicle data transmitted from another device mounted on the corresponding vehicle;

transmitting the vehicle data from each of the multiple in-vehicle devices to the center in a first cycle;

storing, in a second storage unit of the center, the vehicle data sequentially transmitted from each of the multiple in-vehicle devices;

storing, in a third storage unit of the center, an index that includes information associated with the vehicle data stored in the second storage unit;

performing a first update by adding the vehicle data that is received to the vehicle data stored in the second storage unit of the center every time the vehicle data is transmitted from each of the multiple in-vehicle devices; and performing a second update by adding the index stored in the third storage unit in association with latest one of the vehicle data stored in the second storage unit in a second cycle, which does not require synchronization with an update timing of the first update, wherein the index is updated at an index update cycle and the index update cycle is set in relation to an update cycle of the vehicle data.

20. A processing method executed by a center, the center being capable of performing data communication with multiple in-vehicle devices individually mounted on multiple vehicles via communication units of respective vehicles, the processing method comprising:

receiving vehicle data transmitted, in a first cycle, from each of the multiple in-vehicle devices;

storing the vehicle data that is received in a second storage unit;

storing, in a third storage unit, an index that includes information associated with the vehicle data stored in the second storage unit;

performing a first update by adding the vehicle data that is received to the vehicle data stored in the second storage unit of the center every time the vehicle data is transmitted from each of the multiple in-vehicle devices; and performing a second update by adding the index stored in the third storage unit in association with latest one of the vehicle data stored in the second storage unit in a second cycle, which does not require synchronization with an update timing of the first update, wherein the index is updated at an index update cycle and the index update cycle is set in relation to an update cycle of the vehicle data.

* * * * *